(12) United States Patent
Whitehouse et al.

(10) Patent No.: US 6,872,941 B1
(45) Date of Patent: *Mar. 29, 2005

(54) CHARGED PARTICLE TRAPPING IN NEAR-SURFACE POTENTIAL WELLS

(75) Inventors: Craig M. Whitehouse, Branford, CT (US); David G. Welkie, Branford, CT (US)

(73) Assignee: Analytica of Branford, Inc., Branford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/719,330

(22) Filed: Nov. 20, 2003

Related U.S. Application Data

(63) Continuation of application No. 10/056,671, filed on Jan. 1, 2002, now Pat. No. 6,683,301.
(60) Provisional application No. 60/264,856, filed on Jan. 29, 2001, now abandoned.

(51) Int. Cl.[7] .................................................. H01J 49/16
(52) U.S. Cl. ...................................... 250/288; 250/287
(58) Field of Search ................................ 250/288, 287, 250/281

(56) References Cited

U.S. PATENT DOCUMENTS

| | | | | |
|---|---|---|---|---|
| 6,040,575 A | * | 3/2000 | Whitehouse et al. | 250/288 |
| 6,204,500 B1 | * | 3/2001 | Whitehouse et al. | 250/287 |
| 6,229,142 B1 | * | 5/2001 | Bateman et al. | 250/287 |
| 6,469,296 B1 | * | 10/2002 | Hansen et al. | 250/287 |
| 6,683,301 B2 | * | 1/2004 | Whitehouse et al. | 250/288 |
| 2001/0030284 A1 | * | 10/2001 | Dresch et al. | 250/287 |
| 2002/0121594 A1 | * | 9/2002 | Wang et al. | 250/281 |

* cited by examiner

*Primary Examiner*—John R. Lee
*Assistant Examiner*—Johnnie L Smith, II
(74) *Attorney, Agent, or Firm*—Levisohn, Berger & Langsam, LLP

(57) ABSTRACT

A Time-Of-Flight mass spectrometer is configured with a pulsing region and electronic controls that generate a potential well for ions in the pulsing region, due to the repelling effect of a high-frequency electric field that is created in the space immediately proximate to a surface, and an additional static electric field that accelerates ions toward the surface. Ions can be constrained and accumulated over time in the potential well prior to acceleration into the Time-Of-Flight tube for mass analysis. Ions can also be directed to collide with the surface with high energy to cause Surface Induced Dissociation (SID) fragmentation, or with low energy to effect collisional cooling, hence, better spatial focusing, prior to mass analysis. The apparatus and method described in the invention result in refined control of ion fragmentation energy and improved Time-Of-Flight mass analysis performance.

5 Claims, 14 Drawing Sheets

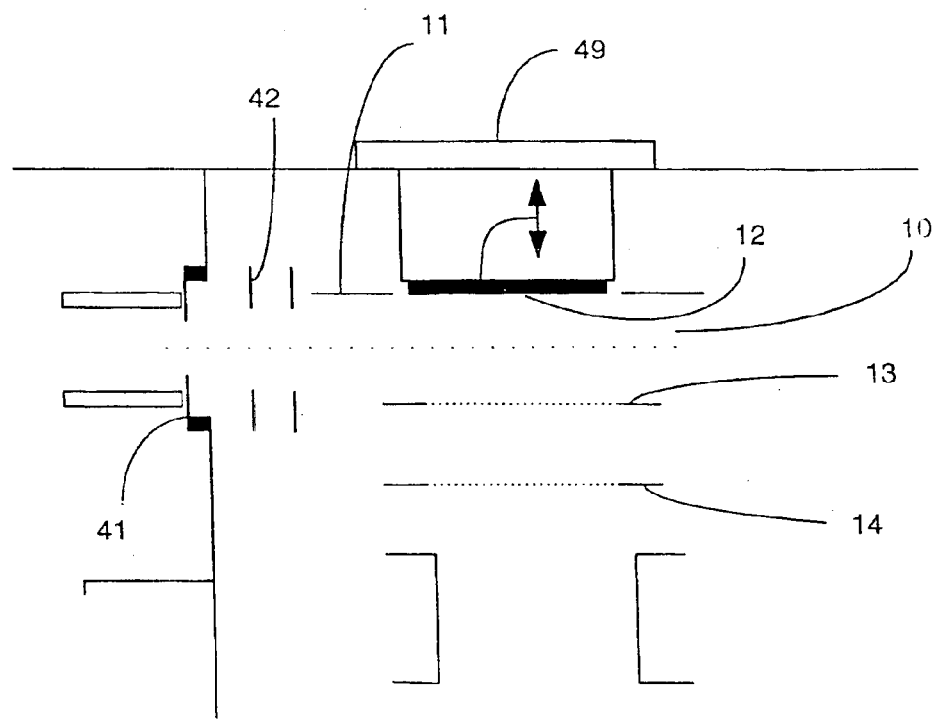
Figure 1A
Figure 1B
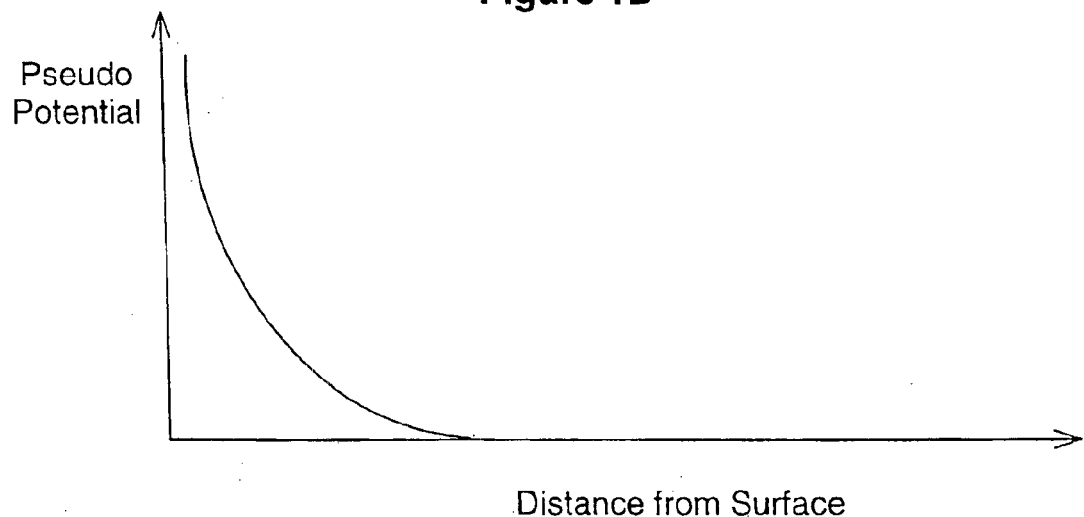
Distance from Surface

CHARGED PARTICLE TRAPPING IN NEAR-SURFACE POTENTIAL WELLS

RELATED APPLICATIONS

This is a continuation of application Ser. No. 10/056,671 filed on Jan. 1, 2002 now U.S. Pat. No. 6,683,301, which claims the benefit of U.S. Provisional Patent Application No. 60/264,856 filed Jan. 29, 2001, now abandoned.

BACKGROUND OF THE INVENTION

Mass spectrometers are used to analyze sample substances containing elements or compounds or mixtures of elements or compounds by measuring the mass to charge of ions produced from a sample substance in an ion source. A number of types of ion sources that can produce ions from solid, liquid or gaseous sample substrates have been combined with mass spectrometers. Ions can be produced in vacuum using ion sources, including, but not limited to, Electron Ionization (EI), Chemical Ionization (CI), Laser Desorption (LD), Matrix Assisted Laser Desorption (MALDI), Fast Atom Bombardment (FAB), Field Desorption (FD) or Secondary Ion Mass Spectrometry (SIMS). Alternatively, ions can be produced at or near atmospheric pressure using ion sources, including, but not limited to, Electrospray (ES), Atmospheric Pressure Chemical Ionization (APCI) or Inductively Coupled Plasma (ICP). Ion sources that operate at intermediate vacuum pressures such as Glow Discharge Ion Sources have also been used to generate ions for mass spectrometric analysis. Ion sources that operate in vacuum are generally located in the vacuum region of the mass spectrometer near the entrance to the mass analyzer to improve the efficiency of ion transfer to the detector. Ion sources that produce ions in vacuum have also been located outside the region near the mass spectrometer entrance. The ions produced in a location removed from the mass analyzer entrance must be delivered to the entrance region of the mass spectrometer prior to mass analysis. Atmospheric or intermediate pressure ion sources are configured to deliver ions produced at higher pressure into the vacuum region of the mass analyzer. The geometry and performance of the ion optics used to transport ions from an ion source into the entrance region of a given mass analyzer type can greatly affect the mass analyzer performance. This is particularly the case with Time-Of-Flight mass analyzers, in which the initial spatial and energy distribution of the ions pulsed into the flight tube of a Time-Of-Flight mass analyzer affects the resulting mass to charge analysis resolving power and mass accuracy.

Mass analysis conducted in a Time-Of-Flight mass (TOF) mass spectrometer is achieved by accelerating or pulsing a group of ions into a flight tube under vacuum conditions. During the flight time, ions of different mass to charge values spatially separate prior to impacting a detector surface. Ions are accelerated from a first acceleration or pulsing region and may be subject to one or more acceleration and deceleration regions during the ion flight time prior to impinging on a detector surface. Multiple ion accelerating and decelerating stages configured in Time-Of-Flight mass spectrometers aid in compensating or correcting for the initial ion spatial and energy dispersion of the initial ion population in the first ion pulsing or accelerating region. The most common lens geometry used in the first TOF ion pulsing or accelerating region is two parallel planar electrodes with the electrode surfaces oriented perpendicular to the direction of ion acceleration into the Time-Of-Flight tube. The direction of the initial ion acceleration is generally in a direction parallel with the TOF tube axis. A linear uniform electric field is formed in the gap between the two parallel planar electrodes when different electrical potentials are applied to the two electrodes. The planar electrode positioned in the direction of ion acceleration into the TOF tube is generally configured as a highly transparent grid to allow ions to pass through with minimal interference to the ion trajectories. To maximize the performance of a Time-Of-Flight mass analyzer, it is desirable to initiate the acceleration of ions in the pulsing region with all ions initially positioned in a plane parallel with the planar electrodes and initially having the same initial kinetic energy component in the direction of acceleration. Consequently, when ions are generated in or transported into the initial accelerating or pulsing region of a Time-Of-Flight mass analyzer, conditions are avoided which lead to ion energy or spatial dispersion at the initiation of ion acceleration into the Time-Of-Flight tube drift region. As a practical matter, a population of gaseous phase ions located in the pulsing region will have a non-zero spatial and kinetic distribution prior to pulsing into a Time-Of-Flight tube drift region. This non zero spatial and kinetic energy spread may degrade Time-Of-Flight mass to charge analysis resolving power, sensitivity and mass measurement accuracy. In one aspect of the present invention, the spatial and energy spread of an ion population is minimized prior to accelerating the population of ions into a Time-Of-Flight tube drift region.

When ion spatial and energy spread can not be avoided in the TOF pulsing or first accelerating region, it is desirable to have the ion energy and spatial distributions correlated so that both can be compensated and corrected for during the ion flight time prior to hitting the detector. A correlation between the ion kinetic energy component in the TOF axial direction and spatial spread can occur in the TOF pulsing region when spatially dispersed ions with a non random TOF axial kinetic energy component are accelerated in a uniform electric field formed between two parallel electrodes. Wiley et. al., The Review of Scientific Instruments 26(12):1150–1157 (1955) described the configuration and operation of a second ion accelerating region to refocus ions of like mass to charge along the TOF flight path that start their acceleration with a correlated spatial and energy spread. Electrode geometries in the TOF tube and voltages applied to these electrodes can be varied with this technique to position the focal plane of a packet of ions of the same mass to charge value at the detector surface to achieve maximum resolving power. The Wiley-McClaren focusing technique improves resolving power when ions occupying a finite volume between two parallel plate electrodes are accelerated. In a uniform electric accelerating field, ions of the same m/z value located closer to the repelling electrode will begin their acceleration at a higher potential than an ion of the same m/z initiating its acceleration at a position further from the repelling electrode. The ion that starts its acceleration nearer to the repelling electrode surface at a higher potential, must travel further than the slower ion which starts its acceleration at a lower potential closer to the extraction grid or electrode. At some point in the subsequent ion flight, the faster ion will pass the slower ion of the same m/z value. By adding a second accelerating region, the location of the point where the ions having the same mass to charge value pass and hence are "focused" in a plane, can be optimized to accommodate a desired flight time and flight tube geometry. The focal point occurring in the first field free region in the TOF drift tube can be "reflected" into a second field free region using an ion mirror or reflector in the ion flight path.

Variations in ion flight time can also be caused by initial ion velocity components not correlated to the spatial spread.

This non-correlated ion kinetic energy distribution can be compensated for, to some degree, by the addition of an ion reflector or mirror in the ion flight path. Ions of the same m/z value with higher kinetic energy in the TOF axial direction will penetrate deeper into the decelerating field of an ion reflector prior to being re-accelerated in the direction of the detector. The ion with higher kinetic energy experiences a longer flight path when compared to a lower energy ion of the same m/z value. Subjecting an ion to multiple accelerating and decelerating electric fields allows operation of a TOF mass analyzer with higher order focusing to improve resolving power and mass measurement accuracy. Configuration and operation of an Atmospheric Pressure Ion Source Time-Of-Flight mass analyzer with higher order focusing is described by Dresch in U.S. Pat. No. 5,869,829. Higher order focusing corrections can not entirely compensate for initial ion kinetic energy spread in the TOF axial direction that is not correlated with ion spatial spread in the initial pulsing or ion acceleration region. Also, higher order focusing can not entirely compensate for ion energy or spatial spreads which occur during ion acceleration, deceleration or field free flight due to ion fragmentation or ion collisions with neutral background molecules. An ion kinetic energy distribution not correlated to the ion spatial distribution can occur when ionization techniques such as MALDI are used. In MALDI ionization, the sample-bearing surface is located in the initial acceleration region of a Time-Of-Flight mass spectrometer. A laser pulse impinging on a sample surface, in a MALDI ion source, creates a burst of neutral molecules as well as ions in the initial accelerating region of a Time-Of-Flight mass analyzer. Ion to neutral molecule collisions can occur during ion extraction and acceleration into the TOF drift tube resulting in an ion kinetic energy spread, ion fragmentation, degradation of resolving power and errors in mass to charge measurement. This problem increases if structural information via ion fragmentation is desired using MALDI Time-Of-Flight mass analysis. Higher energy laser pulses used in MALDI to increase the ion fragmentation also result in increased neutral molecule ablation from the target surface. Even in the absence of ion-neutral collisions, ions generated from the target surface have an initial velocity or kinetic energy distribution that is not well correlated to spatial distribution in the first ion acceleration region. This initial non-correlated kinetic distribution of the MALDI generated ion population can degrade resolving power, and mass accuracy performance in Time-Of-Flight mass analysis.

A technique, termed delayed extraction, has been developed where the application of an electric field to accelerate ions into the TOF drift tube is delayed after the MALDI laser pulse is applied to allow time for the neutral gas to expand, increasing the mean free path prior to ion acceleration. By applying a small reverse accelerating field during the MALDI laser pulse and delaying the acceleration of ions into the Time-Of-Flight tube drift region, as described by Vestal et. al. in U.S. Pat. No. 5,625,184, some portion of the low m/z ions can be eliminated. A portion of the low m/z ions, primarily matrix related ions, created in the MALDI process are accelerated back to the sample surface and neutralized when the reverse electric field is applied. A portion of the slower moving higher mass to charge ions do not return to the target surface as rapidly as the lower molecular weight ions when the reverse accelerating field is applied. After an appropriate delay, these higher molecular weight ions may be forward accelerated into the TOF tube drift region by switching the electric field applied between the two electrodes in the first ion acceleration region.

Delayed extraction also allows many of the ion fast fragmentation processes to occur prior to accelerating ions into the Time-Of-Flight tube drift region, resulting in improved mass to charge resolving power and mass accuracy measurements for the ions produced in fast fragmentation processes. The delayed extraction technique reduces the ion energy deficit which can occur due to ion-neutral collisions in the first accelerating region but does not entirely eliminate it, particularly with higher energy laser pulses. Also, delayed extraction is effective in improving MALDI Time-Of-Flight performance when lasers with longer pulse durations are used. However, even with delayed extraction, there is a limit to the length of delay time, the magnitude of the reverse field during the delay period, the laser power used and the duration of a laser pulse before overall sensitivity or Time-Of-Flight performance is degraded. The delayed extraction technique requires a balancing of several variables to achieve optimal performance, often with compromises to the Time-Of-Flight mass analysis performance over all or some portion of the mass to charge spectrum generated. The present invention improves the performance of MALDI Time-Of-Flight without imposing the restrictions or limitations of conventional delayed extraction techniques and provides more uniform Time-Of-Flight mass analysis performance over a wider mass to charge range.

When ions are generated in an ion source positioned external to the Time-Of-Flight pulsing or first acceleration region, a technique termed "orthogonal" pulsing has been used to minimize effects of the kinetic energy distribution of the initial ion beam. This orthogonal pulsing technique first reported by The Bendix Corporation Research Laboratories Division, Technical Documentary Report No. ASD-TDR-62-644, Part 1, April 1964, has become a preferred technique to interface external ion sources, particularly Atmospheric Pressure Ionization Sources, with Time-Of-Flight mass analyzers. The ion beam produced from an Atmospheric Pressure Ion Source (API) or an ion source that operates in vacuum, is directed into the gap between the two parallel planar electrodes defining the first accelerating region of the TOF mass analyzer. The primary ion beam trajectory is directed to traverse the gap between the two parallel planar electrodes in the TOF first accelerating region substantially orthogonal to axis to the axis of the direction of ion acceleration into Time-Of-Flight tube. When orthogonal pulsing is used, ion kinetic energy in the primary ion beam direction is not coupled to the ion velocity component oriented in the direction of ion acceleration into the Time-Of-Flight tube drift region. The primary ion beam kinetic energy spread oriented along the beam axis only affects the location of ion impact on the planar detector surface, not the ion arrival time at the detector surface. Apparatus and methods have been developed to improve the duty cycle of TOF mass analyzers configured with linear or orthogonal pulsing geometries.

Grix, et. al., in Int. J. Mass Spectrom. Ion Processes 93, 323 (1989) describe an approach for creating and storing ions in the TOF pulsing region between extraction pulses. Sample gas is introduced directly into the TOF pulsing region, and an electron beam is directed to pass through the TOF pulsing region, which ionizes sample gas molecules. The electron beam is sufficiently intense so that the local potential well produced by the electrons traps a substantial number of ions until they are pulsed into the TOF drift region for mass analysis. Several disadvantages of this approach include: 1) sample gas is introduced directly into the TOF optics, degrading the vacuum and causing ion scattering; 2) electron impact ionization results in substantial fragmentation which renders this ionization method impractical for mass analysis of many types of samples, such as large biomolecules; and 3) the sample needs to be introduced into the TOF as a gas, which makes this approach incompatible with non-volatile samples.

Chien, et. al., in Anal. Chem. 66, 1630 (1994), and references therein, describe a configuration which incorporates a Paul three-dimensional RF-quadrupole ion trap as the TOF pulsing region for the TOF mass analysis of ions generated externally by MALDI and by electrospray ionization. Ions can be accumulated in such a trap prior to pulsing the ions out of the trap and into the TOF drift region. However, the continuous transfer of externally-generated ions into such a three-dimensional RF-quadrupole ion trap is problematic because ions with energies great enough to overcome the RF-fields in the trap and enter the trap will generally have too much energy to be trapped once they are in the trap volume. Therefore, complicated schemes are employed with limited success to overcome this difficulty, such as pulsing or ramping the RF voltages on and off in concert with pulsed ion introduction; synchronizing pulsed ion introduction with the phase of the RF waveform; and/or introducing inert gas with which the ions can collide and dissipate kinetic energy during ion trapping. Another disadvantage of this configuration is that the electrode geometry that creates the trapping fields is unable to create the linear fields during the pulsed TOF acceleration necessary for achieving maximum TOF mass resolving power.

Ji, et. al., J. Amer. Soc. Mass Spec. 7, 1009 (1996) describe a three-dimensional planar electrode ion trap configured as the pulsing region of a TOF mass spectrometer. Their approach was to ionize and collect ions directly in the trap by electron-impact ionization of gaseous sample molecules introduced into the trap, and then to pulse the trapped ions into the TOF drift region for mass analysis. This ion optics arrangement is able to produce improved TOF acceleration fields relative to those produced by typical three-dimensional ion traps with curved electrode surfaces. However, a three-dimensional planar-electrode ion trap employed as the pulsing region of a TOF mass spectrometer suffers from difficulties in efficient trapping of ions due to the non-ideal trapping fields, as well as from scattering of ions by the sample gas and by the gas introduced to collisionally cool the ions in the trap, which degrades TOF mass resolution and sensitivity.

Dresch et. al. in U.S. Pat. No. 5,689,111 describe an apparatus and method for improving the duty cycle and consequently the sensitivity of a Time-Of-Flight mass analyzer. Ions contained in a continuous ion beam delivered from an atmospheric pressure ion source into a two-dimensional multipole ion guide, are trapped in the multipole ion guide and selectively released from the ion guide exit into the TOF pulsing region. This apparatus and technique delivers ion packets into the pulsing or first acceleration region of a TOF mass analyzer from a continuous ion beam with higher efficiency and less ion loss than can be achieved with a continuous primary ion beam delivered directly into the TOF pulsing region. Ion trapping of a continuous ion beam in an ion guide effectively integrates ions delivered in the primary ion beam between TOF pulses. When this apparatus and technique is applied to an orthogonal pulsing TOF geometry, portions of the mass to charge range can be prevented from being accelerated into the Time-Of-Flight drift region, reducing unnecessary detector channel dead time, resulting in improved sensitivity and dynamic range. Operation with the orthogonal pulsing technique has provided significant Time-Of-Flight mass analysis performance improvements when compared with the performance using in-line ion beam pulsing techniques.

Franzen in U.S. Pat. No. 5,763,878 describes a multipole ion guide that extends orthogonally into the pulsing region of a TOF mass spectrometer. Ions can be transported from an external ion source into the TOF pulsing region located within a portion of the length of the ion guide, and accelerated orthogonally into the TOF drift region by applying pulsed acceleration voltages to the multipole rods so as to accelerate the ions through the space between two of the rods. One disadvantage of this scheme is that linear acceleration fields required for optimum TOF mass resolving power could not be formed by the inhomogeneous acceleration fields produced by such a multipole rod structure.

Even with orthogonal injection of ions into a pulsed acceleration region with perfectly planar fields, it is not always possible to achieve optimal primary ion beam characteristics in the pulsing region whereby all orthogonal velocity components are eliminated or spatially correlated. An approach intended to overcome such limitations has been described by Whitehouse, et. al., in U.S. Pat. No. 6,040,575. One embodiment of heir invention combines orthogonal ion beam introduction into the TOF pulsing region with ion collection on a surface prior to pulsing the surface collected ion population into the TOF tube drift region. The spatial and energy compression of the ion population on the collecting surface prior to pulsing into the TOF tube drift region improves the Time-Of-Flight mass resolving power and mass accuracy. Their invention also results in improved sensitivity by collecting and storing ions between TOF acceleration pulses that would have been otherwise lost. Further, surface induced dissociation (SID) and subsequent collection, storage, and TOF mass analysis of the resulting fragment ion population is facilitated by directing ions to impact the collecting surface with high energy. However, their approach is practical only if the interaction between the ions and the surface is weak enough so that: 1) the charge on the ions is maintained; 2) the 'sticking probability' for the ions on the surface is high enough to capture and hold ions, but low enough to allow the ions to be desorbed intact and without impedance upon application of the acceleration pulse of the time of flight analyzer, possibly with the assistance of some auxiliary desorption process, such as the application of heat, an ion beam pulse, or a laser pulse; and 3) the deposition and desorption processes can be cycled repetitively many times without substantial degradation of the surface characteristics.

One embodiment of the present invention involves ion collection of externally generated ions in an ion trap in the pulsed acceleration region, but rather than collecting ions on a surface, or in the three-dimensional pseudo potential energy well of a typical three-dimensional RF-ion trap, ions are collected instead in a pseudo-potential energy well that is primarily one-dimensional, with the pseudo potential well axis oriented parallel to the flight tube axis, prior to pulsing the collected ion population into the TOF tube drift region. The resulting constraints on the spatial and energy distributions of the ion population prior to pulsing into the TOF drift region improves Time-Of-Flight performance and analytical capability. Further, by allowing the ions to gently collide with the surface or with an inert gas, the spatial and energy distributions of the ion population collected in the one-dimensional pseudo-potential energy well can be compressed, resulting in addition improvement in Time-Of-Flight performance and analytical capability.

The orthogonal pulsing technique has been configured in hybrid or tandem mass spectrometers that include Time-Of- Flight mass analysis. Two or more individual mass analyzers are combined in tandem or hybrid TOF mass analyzers to achieve single or multiple mass to charge selection and fragmentation steps followed by mass analysis of the product ions. Identification and/or structural determination of compounds is enhanced by the ability to perform MS/MS or multiple MS/MS steps (MS/MS$^n$) in a given chemical analysis. It is desirable to control the ion fragmentation process so that the required degree of fragmentation for a selected ion species can be achieved in a reproducible manner. Time-Of-flight mass analyzers have been configured with magnetic sector, quadrupole, ion trap and additional Time-Of-Flight mass analyzers to perform mass selection and fragmentation prior to a final Time-Of-Flight mass analysis step. Gas phase Collisional Induced Dissociation (CID) and Surface Induced Dissociation (SID) techniques have been used to selectively fragment gas phase ions prior to TOF mass analysis or have been coupled to the ion flight path in the Time-Of-Flight tube. CID ion fragmentation has been the most widely used of the two techniques. Magnetic sector mass analyzers have been configured to perform mass to charge selection with higher energy CID fragmentation of mass to charge selected ions to aid in determining the structure of compounds. Lower energy CID fragmentation achievable in quadrupoles, ion traps and Fourier Transform mass analyzers, although useful in many analytical applications, may not provide sufficient energy to effectively fragment all ions of interest. High energy CID fragmentation can yield side chain cleavage fragment ion types such as w type fragments. This type of fragmentation is less common in low energy CID processes. The additional ion fragmentation information achievable with higher energy fragmentation techniques can be useful when determining the structure of a molecule.

An alternative to CID ion fragmentation is the use of Surface Induced Dissociation to fragment ions of interest. The capability of the Surface Induced Dissociation ion fragmentation technique has been reported for a number of mass analysis applications. Wysocki et. al. J. Am. Soc. for Mass Spec., 1992, 3, 27–32 and McCormack et. al., Anal. Chem. 1993, 65, 2859–2872, have demonstrated the use of SID ion fragmentation with quadrupole mass analysis to controllably and reproducibly achieve analytically useful fragmentation information. McCormack et. al. showed that with collisional energies below 100 eV, w and d type ion fragments can be produced from some peptides. Kiloelectronvolt gas phase collisions may be required to achieve similar ion fragmentation. Higher internal energy transfer to an ion can be achieved in SID than with gas phase CID processes allowing the possibility of fragmenting large, ions, even those with a large number of degrees of freedom and low numbers of charges. Also, the ion collisional energy distributions can be more tightly controlled with SID when compared with gas phase CID processes. A variety of collision surfaces have been used in SID experiments ranging from metal conductive surfaces such as copper and stainless steel to self-assembled aklyl-monolayer surfaces such as octadecanethiolate ($CH_3(CH_2)_{17}SAu$), ferrocence terminated self assembled aklyl-monolayer surfaces and fluorinated self-assembled monolayer (F-SAM) surfaces ($CF_3(CF_2)_7(CH_2)_2 SAu$). The self-assembled monolayer surfaces tend to reduce the charge loss to the surface during the SID process. Winger et. al. Rev. Sci. Instrum., Vol 63, No. 12, 1992 have reported SID studies using a magnetic sector-dual electric sector-quadrupole (BEEQ) hybrid instrument. They showed kinetic energy distributions of up to +/−3 eV for parent and fragment ions leaving a perdeuterated alkyl-monolayer surface after a 25 eV collision. SID collisions have been performed by impacting ions traversing a Time-OF-Flight flight tube onto surfaces positioned in the flight tube and Time-OF-Flight mass to charge analyzing the resulting ion population. Some degree of mass to charge selection prior to SID fragmentation has been achieved by timing the deflection of ions as the initial pulsed ion packet traverses the flight tube. SID surfaces have been positioned in the field free regions and at the bottom of ion reflector lens assemblies in TOF mass analyzers. The resulting TOF mass spectra of the SID fragment ions in these instruments generally have low resolving power and low mass measurement accuracy due in part to the broad energy distributions of the SID fragment ions leaving the surface. A population of ions acquiring a kinetic energy spread during its flight path or during a re-acceleration step in an ion reflector degrades TOF performance. One embodiment of the present invention reduces the broad kinetic energy distributions of ions produced by SID fragmentation prior to conducting Time-Of-Flight mass analysis. In the present invention, one or more steps of ion mass to charge selection and CID fragmentation can be conducted prior to performing a SID fragmentation step in the TOF pulsing region.

The present invention relates to the configuration and operation of a Time-Of-Flight mass analyzer in a manner that results in improved TOF performance and range of TOF analytical capability. Ions produced from an ion source are directed to a region that contains a pseudo potential energy well located in the pulsing or first acceleration region of a Time-Of-Flight mass analyzer prior to accelerating the ions into the Time-Of-Flight tube drift region. Ions in a wide range of mass-to-charge may be trapped and collected in the pseudo potential well prior to accelerating the collected ions into the Time-Of-Flight drift tube region. Such trapping and collecting of ions that may flow continuously into the TOF pulsing region between acceleration pulses improves the duty cycle efficiency of the TOF, resulting in improved sensitivity. Additional improvements in duty cycle efficiency may be realized when the trapping and collection of ions in a pseudo potential well in the TOF pulsing region is coupled to and coordinated with the trapping and release of ions in an ion guide external to the TOF pulsing region. Also, the resulting constraints on the spatial and energy distributions of the collected ion population prior to pulsing into the TOF drift region improves Time-Of-Flight mass resolving power and mass accuracy. Compression of the spatial and velocity distributions of the ion population by directing the ions to gently collide with a surface or with inert gas in conjunction with ion trapping and collection results in additional improvement to the mass resolving power, mass accuracy, and sensitivity. Ions that are detrimental to the mass analysis, such as MALDI matrix ions of high abundance and low mass that may saturate the detector, may be eliminated by selection of the range of mass-to-charge values that is trapped.

Ions can also be directed to collide with an electrode surface with relatively high impact energy, resulting in surface-induced dissociation. The fragment ions can be collected and accumulated in the pseudo potential well and may optionally be cooled by collisions with the surface or inert gas, prior to accelerating the collected ions into the TOF drift tube for mass analysis. Mass analysis of such fragment ions can improve the mass-to-charge measurement accuracy and quantification performance. Performing SID directly in the TOF acceleration region avoids the loss of fragment ions that inevitably occurs when SID is performed external to the TOF acceleration region followed by transport of the fragment ions into the TOF acceleration region prior to TOF mass analysis. Hence, the present invention improves sensitivity for MS/MS analysis using SID or CID.

In one embodiment of the invention, ions entering the TOF first accelerating region are directed toward the bottom of the pseudo potential well by applying a reverse electric field in the TOF acceleration region. Ions collected in the pseudo potential well are accelerated into the flight tube of a Time-Of-Flight mass analyzer by applying a forward electric field in the TOF acceleration region. The collection of ions in the pseudo potential well and forward acceleration of ion packets can occur at repetition rates exceeding 20 kilohertz allowing TOF pulse repetition rates typically used in atmospheric pressure ion source orthogonal pulsing TOF ion mass-to-charge analysis.

A variety of ion sources can be configured according to the invention with the ability to conduct SID with TOF mass analysis. Ions can be produced directly in the TOF first acceleration region or produced external to the first acceleration region. A time-of-flight mass spectrometer configured according to the invention can be selectively operated with or without collection of ions in a pseudo potential well, surface induced dissociation, reaction of ions with surfaces, or collisional cooling by introduction of a collisional cooling gas or controlled collisions with a surface, prior to Time-Of-Flight mass analysis. The invention retains the ability to conduct existing ionization and TOF analysis techniques. The added ion collection, trapping, and collisional cooling in a pseudo potential well and SID fragmentation capabilities expands the overall analytical range of a Time-Of-Flight mass analyzer. A Time-Of-Flight mass analyzer configured and operated according to the invention can be incorporated into a hybrid instrument enhancing MS/MS or MS/MS$^n$ operation. Such an instrument may be configured with a range of atmospheric pressure or vacuum ion sources.

SUMMARY OF THE INVENTION

The pulsing or ion extraction region of a Time-Of-Flight mass spectrometer configured with two parallel planar electrodes is configured such that neutral, retarding and ion extraction electric fields can be applied between the two electrodes. The electrode farthest from the TOF drift region is commonly referred to as the "pusher" electrode of the TOF ion extraction region. In the present invention, the surface of the pusher electrode is configured with a two-dimensional array of smaller electrodes, electrically conducting but isolated from each other, in a narrow grid pattern spanning at least a portion of the pusher electrode surface. Surfaces composed of an array of electrodes to which RF voltages are applied have been described by Franzen, in U.S. Pat. No. 5,572,035. The grid array elements can take a variety of forms, including wire tips arranged in a square, hexagonal, etc. array; closely-spaced long parallel wires; a combination of wire tips and a wire mesh arranged around the tips; and others. Essentially, when high frequency potentials are applied to the grid elements in the appropriate manner, a strongly inhomogeneous high frequency field of low penetration range is produced in the space above the electrode surface. This field acts phenomenologically as a virtual surface for repelling ions of either polarity. The repelling force is referred to as a "pseudo force field", described by a "pseudo potential distribution", and creates effectively a "pseudo potential barrier" for ions above a certain mass-to-charge value. The concept for describing the action of high-frequency fields on a population of ions in terms of a pseudo potential distribution was originally proposed by Dehmelt, et. al., in Adv. At. Mol. Physics, 3, 53 (1967). Because the pseudo potential barrier height decreases with increasing mass, ions with relatively high values of mass-to-charge are trapped with reduced efficiency, depending on the kinetic energy of the ions relative to the amplitude of the high-frequency field. Franzen described the use of surfaces, composed of an array of electrodes with applied RF voltages, in configurations that allowed their use as ion guides to transport ions. In the present invention, RF-field-generating electrode array surfaces are configured to form at least a portion of the pusher electrode surface of the pulsing region of a TOF mass spectrometer. When a static retarding potential difference is applied between the parallel planar electrodes of the pulsing region, the combination of this retarding potential distribution and the "pseudo potential distribution" near the pusher electrode creates what may be described phenomenologically as a "pseudo potential well" for charged particles of moderate energy within a wide range of mass-to-charge values near the pusher plate surface. Additionally, other surfaces surrounding the extraction region may be configured with any combination of static potential electrodes and/or additional, independently controllable arrays of electrodes with dynamic electric fields applied. The surrounding electrode configuration with applied electric fields create potential or pseudo potential barriers at the periphery of the extraction region to prevent loss of ions from the extraction region at those boundaries. The electronics providing voltages to these electrodes is configured such that the neutral, forward and reversed biased (with respect to the TOF axis) static electric fields and high frequency fields can be rapidly applied by switching between power supplies.

In one embodiment of the invention, ions produced in an ion source form an ion beam that enters the pulsing region with the ion beam trajectory substantially parallel to the surfaces of the planar electrodes that define the pulsing region. During the time period when ions are entering the TOF pulsing region, a slight reverse bias field is applied across the two planar electrodes to direct the ions toward the bottom of the pseudo potential well near the pusher electrode. In this manner ions are collected and constrained near the pusher electrode, that is, the planar electrode farthest from the TOF drift region, for a selected period of time before a forward bias electric field between the planar electrodes is applied, accelerating ions from the pseudo potential well into the TOF tube drift region of the mass analyzer. The primary ion beam may be prevented from entering the pulsing region just prior to applying the ion forward accelerating potential to prevent any additional ions from entering the gap between the electrodes prior to ion acceleration into the TOF tube. The continuous collection of ions in the pseudo potential well near the pusher plate, prior to pulsed acceleration of the ion population into the Time-of-Flight drift tube region, improves the duty cycle by collecting all ions within a wide range of mass-to-charge (m/z) values with equal efficiency prior to pulsing. The duty cycle of conventional non-trapping continuous beam orthogonal pulsing increases continuously with the ion m/z value, discriminating against lower mass ions. Collecting ions in a pseudo potential well prior to pulsing reduces the m/z duty cycle discrimination in conventional continuous ion beam orthogonal pulsing Time-Of-Flight mass analysis. The duty cycle is also improved because the process of collecting ions in the pseudo potential well prior to pulsing, serves as a means of integrating ions prior to acceleration into the TOF tube. The ion integration or collection time, however, is limited by space charge buildup in the pseudo potential well, potentially limiting the number of ions which may be effectively collected prior to pulsing. The space charge build up in the pseudo potential well can be controlled to some degree by varying the pulse repetition rate of ions into the TOF mass analyzer. Pulse rates exceeding 20 KHz can be used limited only by the flight time of the m/z range of interest. The ability to accumulate only ions within a certain range of m/z values also allows the elimination of ions that would otherwise be detrimental to the analysis, such as low-mass, high abundance matrix ions in MALDI.

In another embodiment of the invention, the Time-Of-Flight pulsing region configured for orthogonal pulsing, comprises two parallel planar electrodes, between which neutral, retarding and accelerating fields may be applied, and in which the surface of one electrode, the "pusher" electrode, is configured as an array of separate electrodes which can be powered to form a pseudo potential barrier near the pusher electrode surface. The neutral, accelerating, and retarding static electric fields can be applied by rapidly switching power supply outputs to one or both electrodes. Ions traveling into the pulsing region with trajectories substantially parallel to the planar electrode surfaces, traverse the pulsing region with a neutral electric field applied between the two planar electrodes. After a selected period of time, a retarding or reverse electric field is applied between the planar electrodes directing the ions located in the pulsing region gap toward the pusher electrode. Depending on the magnitude of the reverse electric field, the ions will either be trapped in the pseudo potential well near the pusher electrode surface, or the ions will collide with the pusher electrode surface. Again, depending on the magnitude of the reverse electric field, ions may collide with the pusher electrode surface with enough energy to cause surface-induced dissociation and produce fragment ions, or with only enough energy to dissipate some kinetic energy and recoil. In either case, following the collision with the pusher electrode surface, the surviving ions will be captured in the pseudo potential well near the pusher electrode surface. After a preset delay, an accelerating field is applied between the two planar electrodes and the ions are accelerated from the pseudo potential well into the Time-Of-Flight drift region. One or more ion collecting pulses can precede an extraction pulse into the Time-Of-Flight drift region.

In another embodiment of the invention, the pusher electrode surface, consisting of an array of independent electrodes which are powered to create a high-frequency electric field and form a pseudo potential barrier near the pusher electrode surface, is coated or manufactured at the surface with material selected to minimize charge exchange when an ion impacts the surface. In some applications, the pusher electrode surface can be heated to reduce the probability of ions being retained at the surface upon colliding and/or fragmenting. Surface materials that minimize charge exchange will improve ion yield in both SID and in energy-absorbing low impact energy collisions, resulting in higher TOF sensitivity in both cases. In addition to the array of high-frequency electrodes that form the pseudo potential barrier near the pusher electrode surface, the pusher electrode assembly can be comprised of multiple electrode segments with different voltages applied to each segment. Voltages can be applied to a multiple segment electrode during ion collection to help prevent ions from leaving the pseudo potential well in directions normal to the well depth axis, that is, parallel to the pusher plate surface. Additional electrodes can also be configured at the periphery of the acceleration region to generate potentials that constrain ions in directions normal to the pseudo potential well axis. Such fields can be configured advantageously to reduce the spatial distribution of ions in these directions normal to the potential well axis. This results in a reduction of the effects of field distortions in the TOF optics, such as from: deflection fields; edge effects, that is, field distortions due to the mechanical design at field boundaries; and geometrical inaccuracies, such as from mechanical misalignments.

In yet another embodiment of the invention, ions are created in the pulsing region of a Time-Of-Flight mass analyzer while maintaining a substantially neutral field between the two electrodes of the pulsing region. The resulting ion population is subsequently directed to a pseudo potential well near the pusher electrode, created by the application of high-frequency potentials to an array of independent electrodes in the surface of the pusher electrode, prior to pulsing of the ions into the Time-Of-Flight drift region. A specific example of such an embodiment of the invention is the configuration of an Electron Ionization (EI) source in the pulsing region of the Time-Of-Flight mass analyzer. Sample bearing gas is introduced at low pressure into the pulsing region of a Time-Of-Flight mass analyzer with a neutral electric field applied across the pulsing region gap. An electron-emitting filament is turned on with the emitted electrons accelerated into the pulsing region gap to ionize the gas phase sample present. The electron-emitting filament is turned off and a reverse electric field is applied across the pulsing region gap to direct the gaseous ions produced to move toward a pseudo potential well near the pusher electrode. When the EI generated ions have been collected in the pseudo potential well near the pusher electrode, an accelerating field is applied across the pulsing region gap to accelerate the ions into the drift region of the Time-Of-Flight mass analyzer. The EI generated ions can initially be directed toward the pseudo potential well near the pusher electrode with sufficient energy to impact the pusher electrode surface and cause surface induced dissociation, or with low energy to allow non-fragmenting collisions that dissipates ion kinetic energy. The sample gas may be supplied from a variety of inlet systems including but not limited to a gas chromatograph. Collecting EI generated ions in a pseudo potential well and cooling them by allowing collisions with the pusher surface, or with the introduction of collision gas, prior to pulsing into the Time-Of-Flight drift region reduces the ion kinetic energy distribution and spatial spread. This results in higher resolving power and mass accuracy Time-Of-Flight mass to charge analysis. If electron ionization occurs in the presence of the pseudo potential well distribution, the ratio of ionization time to TOF ion acceleration and flight time can be increased resulting in higher overall Time-Of-Flight duty cycle.

In another embodiment of the invention, the pulsing region of a Time-Of-Flight mass analyzer is comprised of two planar electrodes positioned substantially parallel and set a distance apart so as to create a gap between them. This gap is referred to as the TOF first accelerating or pulsing region. The first electrode positioned furthest from the Time-Of-Flight drift region, that is, the "pusher" electrode, is configured as an array of independent electrodes to which high-frequency potentials can be applied so as to create a pseudo potential well near the surface. The second electrode positioned nearest the TOF drift region is commonly referred to as the "counter" electrode. In conjunction with a static electric field created by static potentials applied simultaneously to these two electrodes, as well as possibly other electrodes bordering the TOF first acceleration region, a pseudo potential well is formed near the pusher electrode, to which ions are directed prior to pulsing into the Time-Of-Flight drift region. A neutral, collecting or extraction electric field can be applied between the two pulsing region electrodes to allow collecting of ions in the pseudo potential well near the pusher electrode surface, and to allow the dissipation of kinetic energy by collisions with the pusher plate surface or with inert gas, prior to pulsing the spatially compressed ions into the Time-Of-Flight tube drift region. Alternatively, a laser pulse can be applied to the pusher plate surface to release ions rapidly into an accelerating or delayed extraction field. In this embodiment of the invention, ions generated external to the TOF pulsing region enter the pulsing region in a direction substantially not parallel to the planar electrode surfaces which bound the pulsing region. During the collection period, a reverse electric field is applied across the pulsing region gap to direct ions to the potential well near the pusher electrode surface. The ions may enter the pulsing region gap with an initial trajectory that is directed either toward or away from the pusher electrode surface. After the ion collection period, which may also include SID by high-energy collisions with the pusher electrode surface, or kinetic energy dissipation by low-energy collisions with the pusher electrode surface, or with inert gas, the electric field is reversed in the pulsing region and ions in the pseudo potential well near the pusher surface are accelerated into the Time-Of-Flight tube for mass to charge analysis. This embodiment of the invention provides a means for directing ions into a Time-Of-Flight pulsing region from a wide variety of ion sources or hybrid instrument electrode geometries with minimal impact on the Time-Of-Flight performance. Depending on the electric field strength applied to direct ions to the pseudo potential well, ions can impact the collecting surface with a low impact energy in order to dissipate ion kinetic energy and avoid surface induced dissociation fragmentation, or with sufficient energy to cause surface induced dissociation fragmentation. Ions can be collected for a period of time prior to pulsing into the Time-Of-Flight drift region, improving the duty cycle for some applications and operating modes.

The invention can be configured with a wide range of ion sources including but not limited to, Electron Ionization (EI), Chemical Ionization (CI), Laser Desorption (LD), Matrix Assisted Laser Desorption (MALDI), Electrospray (ES), Atmospheric Pressure Chemical Ionization (APCI), Pyrolysis MS, Inductively Coupled Plasma (ICP), Fast Atom Bombardment (FAB), and Secondary Ion Mass Spectrometry (SIMS). Ions may be subjected to one or more mass to charge selection and/or fragmentation steps prior to entering the Time-Of-Flight pulsing region. The Time-Of-Flight mass analyzer may be configured as a single mass to charge analyzer or as part of a hybrid or tandem instrument. A hybrid Time-Of-Flight mass analyzer configured according to the invention, may include multipole ion guides including quadrupole mass analyzers, magnetic sector, ion trap or additional Time-Of-Flight mass analyzers. One version of a hybrid TOF—TOF arrangement was described by V. Martin, et. al. in World Intellectual Property Organization publication WO077824A1, whereby ions that were mass separated in a first time-of-flight drift space are allowed to collide with the final electrode of a so-called 'reflectron' electrostatic mirror, commonly employed in TOF mass spectrometers in order to achieve improved mass resolving power. Such collisions produce ion fragmentation, and the resulting fragments are then accelerated in the reflectron and mass resolved in the second time-of-flight drift space as they travel toward the detector.

One embodiment of the present invention would configure the rear electrode of such a reflectron as an RF-field generating surface which creates a local potential barrier near its surface, according to the present invention, in addition to a static potential that may be applied to this electrode to help generate the potential gradient in the reflectron. Additionally, a grid is positioned a short distance in front of this rear electrode surface, and, in the normal reflectron mode of operation, a potential is applied to this grid that corresponds more or less to the potential in the reflectron field at the location of the grid, so that the field strength is more or less similar on both sides of the grid, but, in any case, is in the same direction. The potential gradient in the reflectron, and the potential applied to this grid, are ordinarily adjusted so as to allow ion packets of ever increasing mass-to-charge values (mass-to-charge separated during their passage from the source to the rear region of the reflectron) to travel past this grid as they decelerate; to reverse direction in the region between the grid and the RF-field generating surface; and to re-accelerate through the reflectron and into the second drift region toward the detector. According to the present invention, once a packet of ions of a particular mass-to-charge value of interest enters the region between the rear electrode RF-field generating surface and the grid just above the surface, the potential on this grid is switched to a potential that results in an electrostatic field which accelerates the aforementioned ions toward the rear RF-field generating surface. Such a potential also prevents any additional ions of larger mass-to-charge values from being able to reach and penetrate the grid, while any ions of lower mass-to-charge values that may have been present would have previously exited this region and would have either been accelerated or are being accelerated toward the detector. The ions of the selected mass-to-charge value are thereby isolated and trapped in a pseudopotential well formed by the combined effect of the pseudopotential barrier created near the RF-field generating surface of the rear reflectron electrode, and the static potential gradient created by the potential difference between the grid and the RF-field generating surface, in the same manner as described previously for the TOF pulse acceleration region. According to the present invention, these trapped ions can be directed to collide with the RF-field generating surface, either gently in order to dissipate their momentum via 'collisional cooling' and allow better mass resolution in subsequent TOF mass-to-charge analysis; or, the ions may be directed to collide with the surface with sufficient energy to cause fragmentation. Trapped ions can also be fragmented by other well-known means, such as by interaction with a photon beam, electron beam, or ion beam, etc. The fragment ions may then be 'cooled' via subsequent momentum-dissipating collisions with the surface, and then mass-to-charge separated in subsequent TOF analysis. A TOF analysis of these trapped ions may be performed by applying a fast step change of the potential on the rear RF-field generating electrode of the reflectron and/or the potential of the grid above this electrode, thereby creating a pulsed acceleration region in this rear region of the reflectron, which accelerates ions back toward the detector.

A variation of this scheme is to configure the rear electrode of the reflectron, or other similar electrostatic mirror structure, not as a solid surface which supports an RF-field generating electrode structure, but rather as a highly-transparent grid consisting of an array of fine, closely-spaced parallel wires arranged in the plane at the position that otherwise corresponds to that of the rear electrode of the reflectron. In this grid structure, every other wire is connected together, and connected to one phase of an RF voltage, and the remaining wires are connected together and connected to the opposite phase of the RF voltage. Such a structure generates a highly inhomogeneous RF field close to the plane of the wires and so forms a pseudo potential barrier near the plane of the wires for ions of moderate energy within a wide mass range. Ions of a particular mass-to-charge value can be trapped by applying a repelling potential to an intermediate grid located in front of the rear RF-field generating grid structure at the proper time, as described above for a solid rear reflectron electrode. After isolating and trapping ions of a particular mass-to-charge value, the trapped ions can be fragmented by various means, such as by interactions with photons, electrons, or ions, any of which can be directed through the trapping region, or by allowing the trapped ions to collide with surfaces provided, for example, at the periphery of the trapping region, or by other means. The momenta of the trapped ions and/or ion fragments can also be reduced by allowing them to collide with nearby surfaces, or with gas molecules introduced for this purpose. Trapped ions and/or ion fragments, can then be pulse accelerated along the TOF axis through the RF-field generating wire structure, in the initial TOF direction, by greatly increasing the DC potential gradient between the intermediate trapping grid and the RF-field generating wire structure, either with or without first removing the RF-field. The ions are pulse accelerated into a subsequent TOF drift space beyond the first TOF drift space and are thereby mass-to-charge separated. This second TOF mass-to-charge analysis can also incorporate additional time-of-flight focusing devices, such as additional reflectrons, beam blanking devices, etc., in order to improve TOF performance.

According to the invention, analytical sequences can be run that include ion surface induced dissociation alternating with, or sequential to, gas phase collision induced dissociation in hybrid or tandem mass analyzer configurations. The invention can be used to study ion-surface interactions as well with prior mass to charge selected ion populations. The surface of the electrode used for ion collisions, as described in the invention, may be comprised of a variety of materials including but not limited to metals or other conductor material, semiconductor materials, dielectric materials, Self Assembled Monolayers (SAM) or combinations of materials.

BRIEF DESCRIPTION OF THE FIGURES

FIG. 1A is diagram of one embodiment of the invention, in which a portion of a planar electrode in the pulsing region of a Time-of-Flight mass spectrometer is configured as an array of electrodes to which RF voltages are applied to create a pseudo potential barrier for ions above this surface.

FIG. 1B is a schematic diagram of a pseudo potential distribution created near the RF-field-generating-surface of FIG. 1A, for ions of a certain mass to charge, as a function of the distance from the RF-field-generating surface.

DETAILED DESCRIPTION OF THE INVENTION AND THE PREFERRED EMBODIMENTS

Figure 1C:
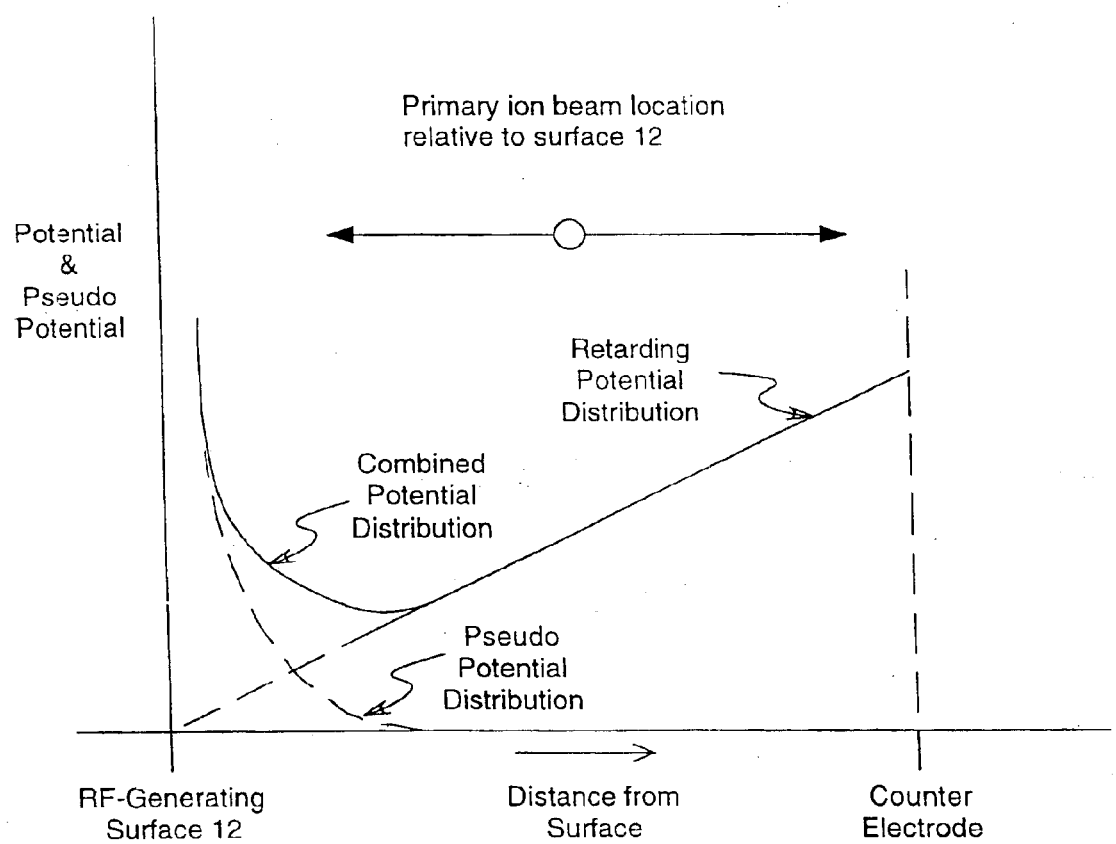
FIG. 1C is a schematic diagram of the pseudo potential well formed for ions of a certain mass to charge when the pseudo potential distribution of FIG. 1B is combined with a static retarding potential distribution in the pulsing region of a Time-Of-Flight mass analyzer.

Time-Of-Flight (TOF) mass analyzers that incorporate a linear or an orthogonal pulsing region as a means for pulsing ion bunches into the Time-Of-Flight tube are well known to those skilled in the art. Orthogonal pulsing Time-Of-Flight (O-TOF) mass analyzers are typically configured with the ion source located external to the TOF pulsing region. The primary beam of ions exiting an ion source is directed into the pulsing region of the TOF with a trajectory oriented substantially orthogonal to the axis of the Time-Of-Flight tube drift region. Several types of ion sources can be interfaced with orthogonal pulsing Time-Of-Flight mass analyzers. These include but are not limited to Electron Ionization (EI), Chemical ionization (CI), Photon and Multiphoton Ionization, Fast Atom Bombardment (FAB), Laser Desorption (LD), Matrix Assisted Laser Desorption (MALDI), and Thermospray (TS) sources, as well as Atmospheric Pressure Ion (API) sources including Electrospray (ES), Atmospheric Pressure Chemical Ionization (APCI), Pyrolysis and Inductively Coupled Plasma (ICP) sources. Orthogonal pulsing Time-Of-Flight mass analyzers have been configured in tandem or hybrid mass spectrometers. Ions can be delivered to the Time-Of-Flight orthogonal pulsing region from several mass analyzer types including but not limited to multipole ion guides including quadrupoles, hexapoles or octopoles or combinations thereof, triple quadrupoles, magnetic sector mass analyzers, ion traps, Time-Of-Flight, or Fourier transform mass analyzers. Hybrid or tandem instruments allow one or more steps of mass to charge selection or mass to charge selection with fragmentation (MS or MS/MS") combined with orthogonal pulsing Time-Of-Flight mass analysis.

One preferred embodiment of the invention is the configuration of an orthogonal Time-Of-Flight (TOF) pulsing region such that ions entering the pulsing region can be directed to a pseudo potential well located in the pulsing region prior to pulsing the ions into the Time-Of-Flight drift region, as shown in FIG. 1A. A pseudo potential well is created in the TOF pulsing region by the combination of a pseudo potential barrier formed near the surface 12 of the planar electrode 11, commonly referred to as the "pusher" electrode, comprising the boundary of the TOF pulsing region farthest from the TOF drift region, and a static electric field formed in the TOF pulsing region by a potential difference applied between the pusher electrode 11 with surface 12 and the planar electrode 13. Planar electrode 13 forms the boundary of the TOF pulsing region that is closest to the TOF drift region, commonly referred to as the "counter electrode" or "extraction electrode". The extraction electrode 13 is typically composed of a high-transparency grid, or a plate with an aperture hole or slot so as to allow ions to exit the TOF pulsing region and proceed into or toward the TOF drift region. The surface 12 of planar electrode 11 is composed of an array of electrodes, such as a square array of wire tips, with neighboring wire tips alternately connected to opposite phases of a high-frequency alternating voltage. The connection of the tips is alternated such that every other tip in both the horizontal or vertical directions of the grid is the same phase. With the application of a high-frequency alternating voltage to the electrode array in this manner, a highly inhomogeneous high-frequency (RF) alternating electrostatic field is established immediately above the surface 12.

The action of the RF-field that forms above the surface 12 is to alternately attract and repel charged particles. Integrated over time, a net repelling force results. As discussed by Dehmelt, in Adv. At. Mol. Physics, 3, 53 (1967), this integrated repelling force field is often called a "pseudo force field", described by a "pseudo potential distribution". For a single wire tip, this pseudo potential is proportional to the square of the RF-field strength and decays as a function of distance r from the tip with a $1/r^4$ dependence. Additionally, the pseudo potential is inversely proportional to both the particle mass m and the square $w^2$ of the RF frequency w. For an array of wire tips, such as described above, the pseudo potential is stronger than that of a single tip, and decays even more rapidly as a function of distance from the surface formed by the tip array. In a distance that is large compared to the distance between neighboring wire tips, the RF-field is negligible. The net effect is the formation of a steep pseudo potential barrier localized very near the real surface with low penetration into the space above the surface for ions of moderate kinetic energies. Similar pseudo potential distributions can be formed above surfaces that are composed of other array formats, such as the combination of wire tips and a wire mesh formed around the tips, where the tips and the mesh have opposite RF phases applied; and an array of closely-spaced long parallel wires, where every other wire has the opposite RF phase applied relative to neighboring wires. The pseudo potential distribution above such surfaces is illustrated in FIG. 1B as a function of distance from the surface. In one embodiment of the present invention, such a surface is employed as the pusher electrode in the pulsed acceleration region of a TOF mass spectrometer. Because the pseudo potential distribution penetrates only a very short distance above the pusher electrode, the remainder of the pulsed acceleration region can contain electric fields essentially independent of the local RF-fields above the pusher electrode surface. Therefore, a pulsed acceleration region configured with a pseudo potential distribution above the pusher electrode surface can utilize all of the methods of operating the pulsed acceleration as without the pseudo potential distribution near the pusher electrode surface. In particular, a field-free condition can be established everywhere in the pulsed acceleration region away from the RF-fields close to the pusher electrode surface in order to allow the ions to enter the pulsed acceleration region. Then, a static repelling ('repelling' in the sense that ions of one polarity are accelerated away from the TOF drift region) electric field can be established in the acceleration region in addition to the pseudo potential distribution above the pusher electrode surface. The combined effect of such a static electric field and that of the pseudo potential barrier near the pusher electrode surface is the creation of a pseudo potential well near the pusher electrode surface. The potential distribution of such a pseudo potential well is illustrated in FIG. 1C. Ions of moderate energies located in the pulsed acceleration region will oscillate indefinitely and therefore be trapped in such a potential well when the strength of the pseudo force field above the pusher electrode surface and the strength of the static electric field elsewhere in the acceleration region are large relative to the kinetic energy of the ions, as measured perpendicular to the pusher electrode surface. The magnitude of these ion oscillations in the pseudopotential well can be minimized if the initial ion beam entering the pulsed acceleration region is directed so that the ion beam is centered near the position of the pseudo potential well minimum when the fields are applied. The beam can be located farther away or closer to the pusher electrode surface to determine the initial ion energy in the TOF axial direction upon TOF pulsed acceleration.

The present invention allows the performance of the TOF mass analyzer to be de-coupled from the phase space characteristics of the ion beam in the pulsed acceleration region. Generally, many performance characteristics of the TOF mass analyzer, such as the mass resolving power and sensitivity, depend on the initial spatial and velocity distributions of the ion population, as measured parallel to the TOF axial direction in the pulsed acceleration region. In general, maximum performance is achieved when these distributions are minimized. However, the ease with which these distributions can be manipulated and maintained depends to a large extent on the kinetic energy of the ions. Ion beams with relatively low ion kinetic energies are much more susceptible to distortion due to ion beam space charge forces, surface charge forces, electrostatic focus lens aberrations, fields due to surface contact potential differences, and other effects. On the other hand, the effective duty cycle, hence sensitivity, of the TOF mass spectrometer declines as the ion energy increases. Therefore, the kinetic energies of ions as they enter the TOF pulsed acceleration region is typically adjusted to some compromise value, often in the vicinity of 10 eV or more, which frequently results in duty cycles of only several percent. In contrast, the present invention allows the TOF performance to be independent of the phase space characteristics, that is, the spatial and velocity distributions, of the ions in the initial ion beam. Consequently, the initial ion kinetic energies can be reduced to less than ~1 eV, or even ~0.5 eV, as they enter the TOF pulsed acceleration region, without loss of performance in terms of mass resolution or sensitivity, while resulting in improved TOF duty cycle and hence sensitivity.

Alternatively, ions may be allowed to collide with the pusher electrode surface if the RF voltage amplitude driving the array of electrodes in the pusher electrode surface is reduced, and/or if the static retarding electric field in the pulsed acceleration region is increased. The energy by which ions collide with the pusher electrode surface can be varied by proper adjustment of these voltage amplitudes. Ions can be directed to the pusher electrode surface with low energy to allow collisions with little or no fragmentation. Low-energy collisions of ions with the pusher electrode surface prior to acceleration of the ions into the Time-Of-Flight drift region serves to decrease the ion energy distribution as kinetic energy is dissipated in the surface during the collisions. Consequently, the recoiled ions will subsequently oscillate in the pseudo potential well with reduced amplitudes due to their reduced kinetic energy, and therefore the spatial spread of the ion population will also be reduced. Low energy collisions with the pusher electrode surface may be more easily facilitated by steering the initial primary ion beam toward the pusher electrode surface from outside the pulsed acceleration region, or by physically moving the pusher electrode surface forward toward the primary ion beam axis. Either of these approaches also allows the initial ion energy in the TOF axial direction to be adjusted for maximum performance. The reduction in ion kinetic energy and spatial spread result in increased Time-Of-Flight resolving power and mass accuracy. Introducing an inert gas with which the ions can collide during their oscillations in the pseudo potential well can also dissipate the ions' kinetic energy. Alternatively, ions can be directed to collide with the pusher electrode surface with energy sufficient to cause surface induced dissociation (SID) fragmentation when the ions impact the surface. The fragment ions can then be collected in the pseudo potential well above the surface prior to subsequent low-energy surface collisions or collisions with inert gas molecules to dissipate kinetic energy, subsequent high-energy collisions with the pusher electrode surface to affect additional SID, or be pulse-accelerated directly into the TOF drift region for mass analysis. Surface induced dissociation can serve as the primary ion fragmentation method or can compliment ion fragmentation accomplished with gas phase collisional induced dissociation conducted in a tandem MS or hybrid mass spectrometer prior to performing Time-Of-Flight mass analysis. One example of a hybrid mass analyzer with a preferred embodiment of the invention is diagrammed in FIG. 1D.

Figure 1D:
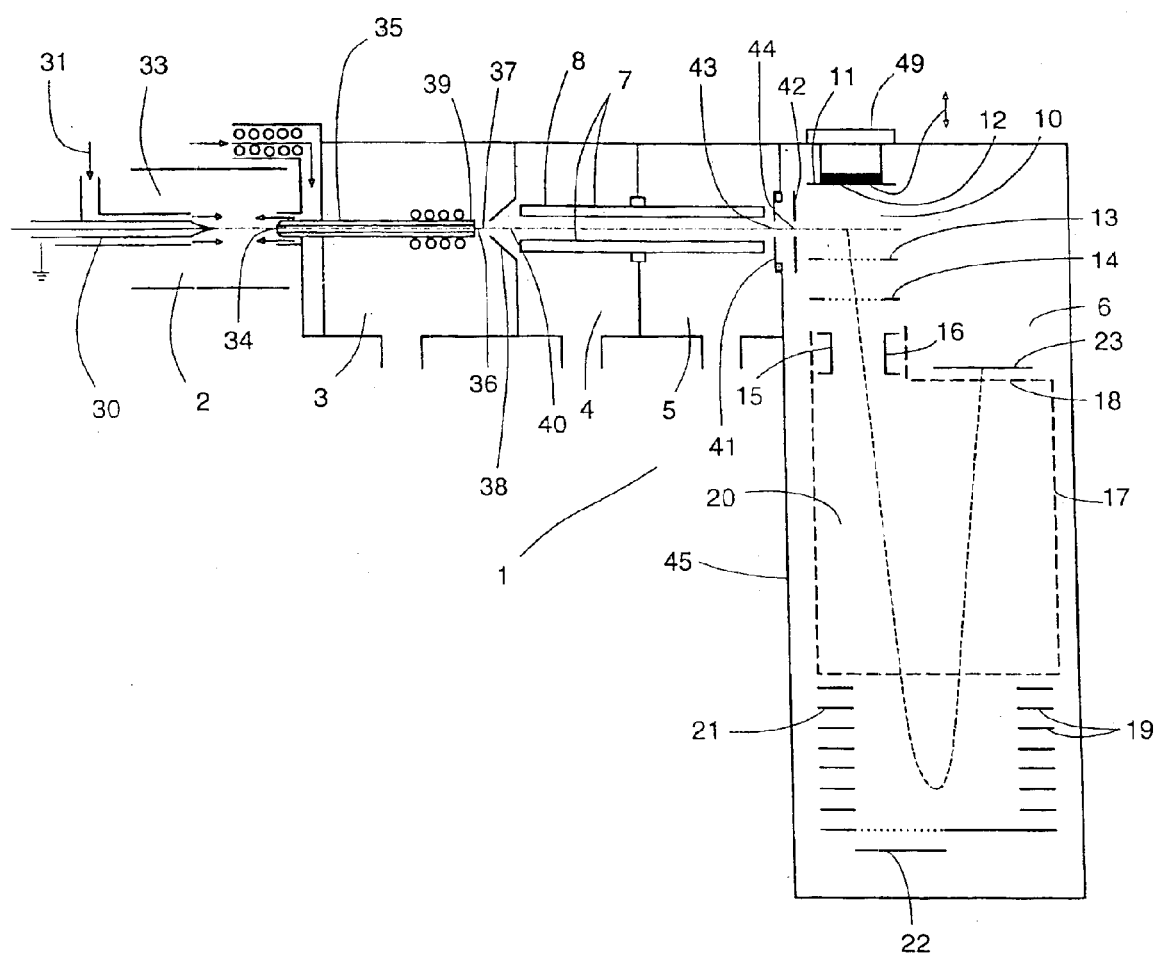
FIG. 1D is a diagram of an orthogonal pulsing Time-Of-Flight mass analyzer configured with an Electrospray ion source and surfaces in the Time-Of-Flight pulsing region for generating a pseudo potential well in the Time-Of-Flight pulsing region.

FIG. 1D is a diagram of an orthogonal pulsing Time-Of-Flight mass analyzer configured with an Electrospray (ES) ionization source and a multipole ion guide ion trap. The multipole ion guide that extends continously into multiple vacuum pumping stages can be operated in RF only, mass to charge selection or ion fragmentation mode as described in U.S. Pat. Nos. 5,652,427; 5,689,111; 5,962,851; and 6,011,259. The instrument diagrammed can be operated in MS or MS/MS$^n$ mode with gas phase collisional induced dissociation (CID). In addition, the invention allows surface induced dissociation and collection of ions in a pseudo potential well prior to pulsing into the flight tube of the Time-Of-Flight mass analyzer. Hybrid Time-Of-Flight mass analyzer 1 diagrammed in FIG. 1D includes Electrospray ion source 2, four vacuum pumping stages 3, 4, 5 and 6 respectively, multipole ion guide 8 that extends into vacuum pumping stages 4 and 5, orthogonal Time-Of-Flight pulsing region 10 including pusher electrode 11 with pusher electrode surface 12 formed by an array of separate electrodes with applied RF voltages, Time-Of-Flight drift region 20, single stage ion reflector or mirror 21 and detectors 22 and 23. Liquid sample bearing solution is sprayed into Electrospray source 2 through needle 30 with or without pneumatic nebulization assist provided by nebulization gas 31. The resulting ions produced from the Electrospray ionization in Electrospray chamber 33 are directed into capillary entrance orifice 34 of capillary 35. The ions are swept though capillary 35 by the expanding neutral gas flow and enter the first vacuum stage 3 through capillary exit orifice 36. A portion of the ions exiting capillary 35 continue through skimmer orifice 37 and enter multipole ion guide 8 at entrance end 40 located in the second vacuum pumping stage 4. Ions exiting ion guide 8 pass through orifice 43 in exit lens 41 and through orifice 44 of focusing lens 42 and are directed into pulsing region or first accelerating region 10 of Time-Of-Flight mass analyzer 45 with a trajectory that is substantially parallel to the surface of planar electrodes 11 and 13. The surfaces of planar electrodes 11 and 13 are positioned perpendicular to the axis of Time-Of-Flight drift tube 20. Pusher electrode surface 12 is configured as part of pusher electrode 11 and counter or ion extraction electrode 13 is configured with a high transparency grid through which ions are accelerated into Time-Of-Flight drift region 20. Pusher electrode surface 12 is composed of an array of closely-spaced wire tips arranged in a two-dimensional grid pattern similar to that of FIG. 5A, where every other tip is connected to one phase of a high-frequency alternating potential, and neighboring tips are connected to the opposite phase of the high-frequency alternating potential. The high-frequency alternating potential may be referenced to a second varying or static DC voltage. The tips may be formed in a variety of ways, including the actual termination of wires bundled together but with each wire electrically isolated from its neighbor wire tips; or by integrated circuit fabrication methods well known in the integrated circuit industry; or by microfabrication methods well known to those in the microfabrication industry. The gap between pusher electrode 11 with pusher surface 12 and counter electrode 13 defines the orthogonal pulsing or first accelerating region 10. The position of pusher electrode surface 12, with or without the position of pusher electrode 11, may be adjusted relative to the primary ion beam centerline, as illustrated in FIGS. 1A and 1D, to bring the ions to a specific location in the potential well.

During orthogonal pulsing TOF operation, a substantially neutral or zero electric field is maintained in pulsing region 10 during the period when ions are entering the pulsing region from multipole ion guide 8. At the appropriate time, an accelerating field is applied between electrodes 11 with surface 12 and electrode 13 to accelerate ions into Time-Of-Flight tube drift region 20. During the initial ion acceleration and subsequent ion flight period, the appropriate voltages are applied to lenses 11, 13, 14, steering lenses 15 and 16, flight tube 17, ion reflector electrodes 19, post accelerating grid 18 and detector 23 to maximize Time-Of-Flight resolving power and sensitivity. Ions pulsed from the Time-Of-Flight first accelerating region 10 may be directed to impact on detector 22 or 23 depending on the analytical result desired. If the pulsed ion beam is steered with steering lenses 15 and 16, detector 22 or 23 can be tilted as is described in U.S. Pat. No. 5,654,544 to achieve maximum resolving power. Prior to entering Time-Of-Flight pulsing region 10, the original ion population produced by Electrospray ionizaton may be subjected to one or more mass selection and/or fragmentation steps. Ions may be fragmented through gas phase collisional induced dissociation (CID) in the capillary skimmer region by applying the appropriate potentials between the capillary exit electrode 39 and skimmer 38. In addition, the analytical steps of ion trapping and/or single or multiple step mass to charge selection with or without ion CID fragmentation can be conducted in multipole ion guide 8 as described in U.S. Pat. Nos. 5,689,111 and 6,011,259. Said mass selection and CID fragmentation steps are achieved by applying the appropriate RF, DC and resonant frequency potentials to rods or poles 7 of multipole ion guide 8. A continuous or gated ion beam of the resulting ion population in multipole ion guide 8 can be transmitted into Time-Of-Flight pulsing region 10 from ion guide 8 through lens orifices 43 and 44 in electrodes 41 and 42, respectively.

Figure 2A:
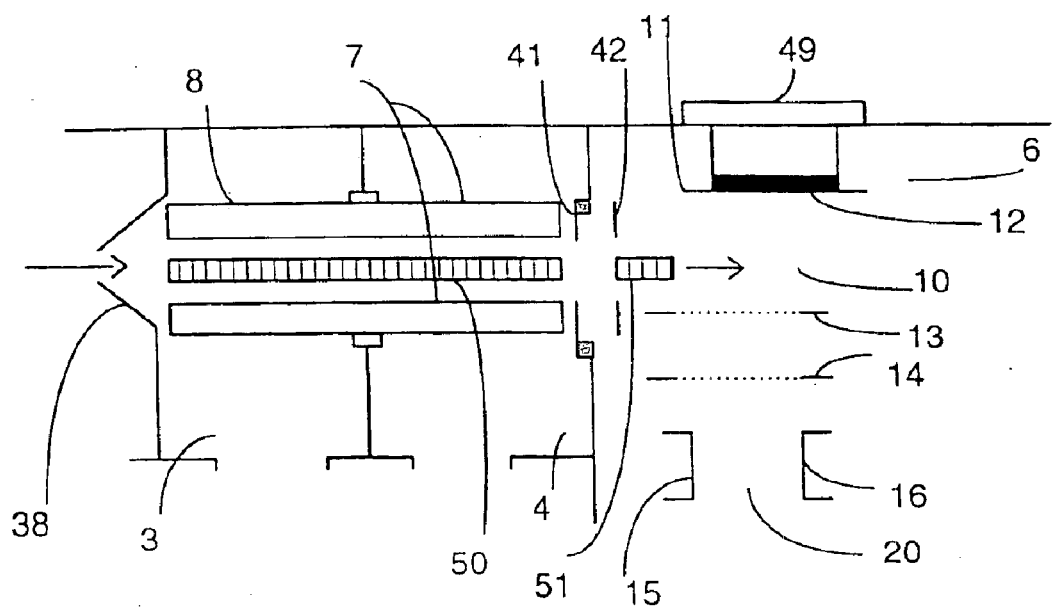
FIGS. 2A through 2D diagram one embodiment of the invention wherein initially trapped ions are introduced batchwise into the Time-Of-Flight pulsing region, collected in the pulsing region pseudo potential well and subsequently accelerated into the Time-Of-Flight tube.

FIGS. 2A through 2D illustrate a progression of steps embodied in the present invention wherein ions trapped in ion guide 8 are gated into Time-Of-Flight pulsing region 10 and collected in pseudo potential well near surface 12 prior to accelerating said ions into Time-Of-Flight tube drift region 20. Referring to FIG. 2A, ions 50 are initially trapped in multipole ion guide 8 by setting a retarding or trapping potential on exit lens 41 relative to the DC offset potential applied to ion guide rods 7 as is described in U.S. Pat. No. 5,689,111. A substantially neutral or zero field is initially set in pulsing region 10. The retarding potential applied to lens 41 is lowered for a set time period, then reapplied, to gate ion packet 51 from ion guide 8 into pulsing region 10. The translational energy of ion packet 51 is determined by the voltage difference between the ion guide offset potential and the substantially equal voltages initially set on electrodes 11 and 13. During the period when the ions are being gated out of ion guide 8, voltages are applied to electrodes or lenses 41 and 42 to optimize the ion transfer into pulsing region 10. Ideally, ions traversing pulsing region 10 prior to pulsing into TOF tube drift region 20 should have no velocity component in the direction perpendicular to the surface of lenses 11 and 13. As this condition is difficult to achieve, alternatively, the initial ion trajectory in the pulsing region should be directed such that any orthogonal component of velocity should be correlated to the ion spatial location. Such a condition can be approximated if ions are directed into the pulsing region as a parallel beam or from a point source as is described in U.S. Pat. No. 5,869,829. In practice, ions contained in ion packet 51 that enter Time-Of-Flight pulsing region 10 have the primary direction of their initial velocity parallel to the surface of lenses 11 and 13 with a small component of velocity in the non-parallel or orthogonal direction. The lower the axial velocity component of ion packet 51, the more difficult it is to optimize the ion trajectory into pulsing region 10. In practice, below 10 eV, it becomes difficult to prevent an increase in the orthogonal velocity and spatial distribution of ion packet 51 as it traverses pulsing region 10. In the embodiment of the invention diagrammed in FIG. 2, ions traversing pulsing region 10 are directed toward the bottom of the pseudo potential well formed by a pseudo potential force field or barrier near surface 12 of electrode 11 and a static electric field formed by a static potential difference between pusher electrodes 11 with surface 12 and counter electrode 13, prior to being pulsed into Time-Of-Flight tube drift region 20. The collection of ions in pseudo potential well near surface 12 prior to extraction, limits any further expansion of the initial ion packet spatial distribution in pulsing region 10 by the constraining action of the potential and pseudo potential barriers forming the well. Ions can be accumulated over time within the pulsed acceleration region, and therefore improve sensitivity, without suffering a loss of mass resolving power due to spatial spreading of the accumulated ion population, at least until space charge effects within the well become significant. By directing the ions to collide with the pusher electrode surface 12 with low-energy collisions, the kinetic energy of the ions can be reduced, leading to a simultaneous reduction in their spatial spread as the lower-energy ions settle deeper in the pseudo potential well. The accumulation of ions above surface 12 allows a lower primary ion beam energy because the parallel quality of the beam need not be as carefully controlled. Consequently, primary ion beam energies even below 1 eV can be directed into pulsing region 10. The accumulation decouples the initial beam quality from the initial beam pulse. A lower primary ion beam energy causes less ion movement in the pseudo potential well, thereby increasing trapping efficiency. Generally, the collection of ions in a pseudo potential well decouples the TOF pulse from the primary ion beam velocity or spatial distribution. Consequently, Time-Of-Flight resolving power can be improved over a wide range of primary ion beam conditions with the collection of ions, or of ion fragments resulting from surface induced dissociation, in a pseudo potential well near surface 12 prior to acceleration into Time-Of-Flight tube drift region 20. Examples of ion collection in and extraction sequences from a pseudo potential well near surface 12 will be described with reference to FIGS. 2 through 11.

Figure 2B:
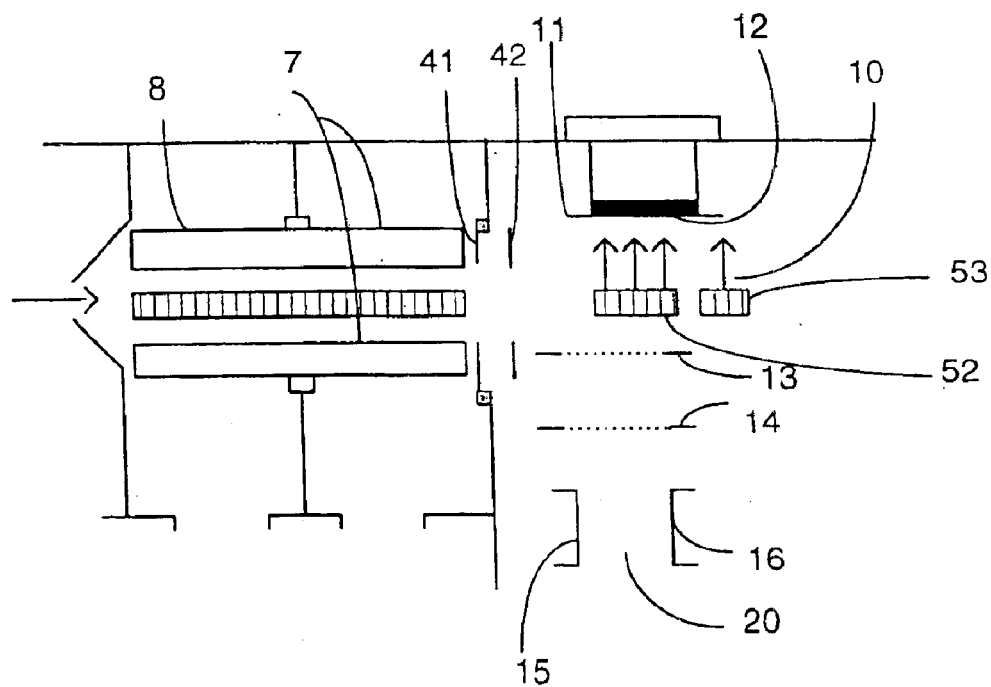

Depending on the initial length of ion packet 51 as determined by the gate ion release time, some Time-Of-Flight mass to charge separation can occur in the primary ion beam as ion packet 51 traverses pulsing region 10. By timing the gate ion release time and the travel time of the resulting ion packet into the pulsing region prior to orthogonal pulsing, a portion of the mass to charge scale can be prevented from entering Time-Of-Flight tube drift region 20 as described in U.S. Pat. No. 5,689,111. As diagrammed in FIG. 2B, Time-Of-Flight separation occurs between ions of different mass to charge in initial ion packet 51 as ion packet 51 traverses pulsing region 10 forming separate ion packets 52 and 53. Lower mass to charge ions comprising ion packet 53 have a higher velocity than the higher mass to charge ions comprising ion packet 52 causing mass to charge separation as initial ion packet 51 traverses pulsing region 10. FIG. 2B shows the point in time where the neutral field in pulsing region 10 has been switched to a field that directs the ions in packets 52 and 53 toward electrode 11 and RF-field-generating surface 12. Ions in packet 53 are beyond the usable pulsing region volume and are eliminated from any subsequent extraction into Time-Of-Flight tube drift region 20. This is desirable in some analytical applications where lower mass to charge ions that are not of interest can deaden detector channels prior to the arrival of higher mass to charge ions at the detector surface for a given TOF pulse. Removing lower mass to charge ions in a TOF pulse can increase the sensitivity and reproducibility of higher mass to charge ion detection for a given analysis. Elimination of lower mass to charge ions can also be achieved with the present invention by adjustment of the amplitude of frequency of the RF-field above the surface 12, which determines the smallest mass to charge that the field will repel.

Ion packet 52 is directed toward the pseudo potential well minimum near the surface 12, and ions will arrive at the location of the pseudo potential well minimum with a kinetic energy component normal to surface 12 that is determined by the ions' initial kinetic energies in this direction and the potential difference between the ions' initial positions and the position of the pseudo potential well minimum. If an ion's kinetic energy is insufficient to surmount the pseudo potential barrier subsequently encountered by an ion near surface 12, then the ion will be trapped in the pseudo potential energy well. If an ion's kinetic energy component normal to the surface is sufficient to overcome the pseudo potential barrier near surface 12, then the ion will collide with surface 12 and either dissipate kinetic energy in the collision upon recoil, or dissociate into fragment ions due to SID. The surface composition is chosen so as to prevent the retention of ions upon impact, in these cases. The energy of impact will be determined by the combination of the parallel and orthogonal kinetic energy components at the point when the ion impacts the surface. The ion orthogonal velocity component at impact is determined by the strength of the reverse electric field applied in pulsing region 10, the initial ion position in pulsing region 10 when the reverse electric field is applied, the strength of the RF-fields experience by the ions as they approach close to the surface 12, and the initial ion beam kinetic energy.

Figure 2C:
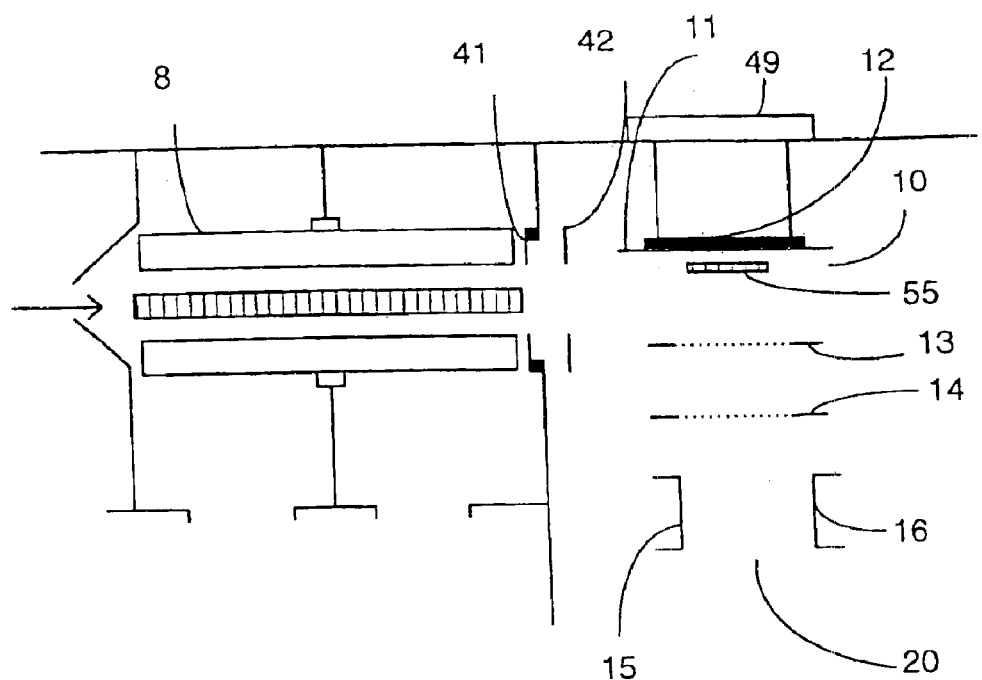
Figure 2D:
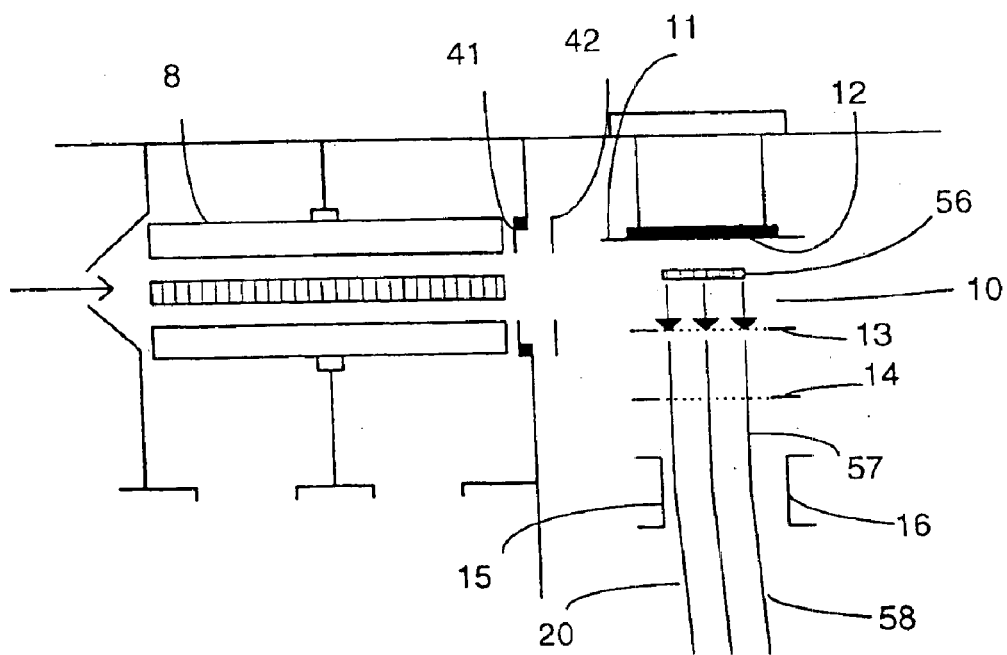
Figure 3A:
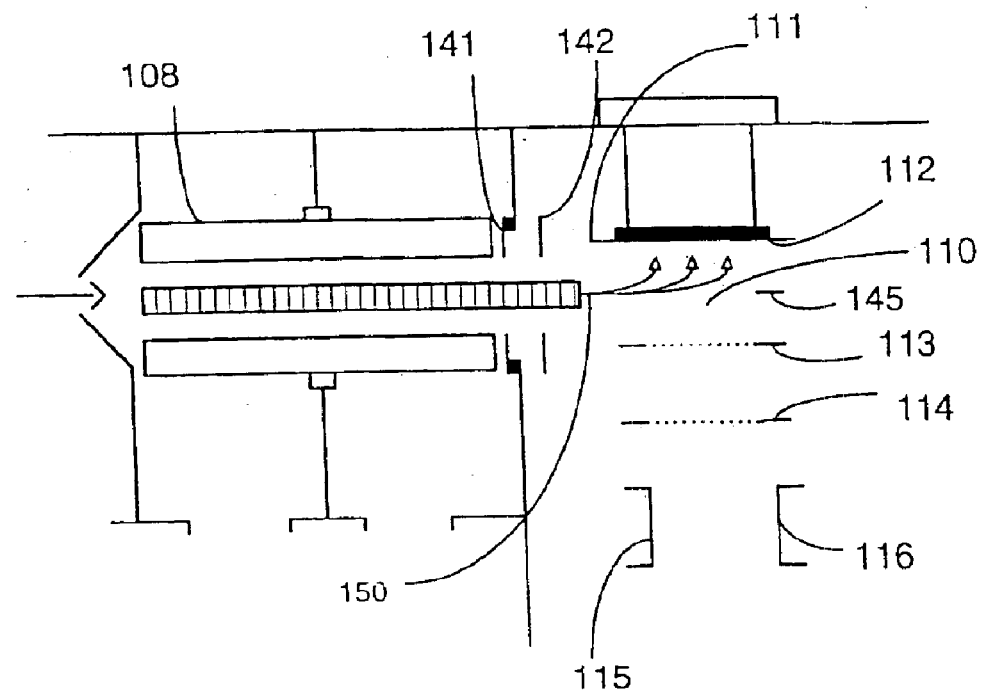
FIGS. 3A through 3D diagram one embodiment of the invention wherein ions are collected in a pseudo potential well in the Time-Of-Flight pulsing region from a continuous ion beam prior to acceleration into the Time-Of-Flight tube.
Figure 3B:
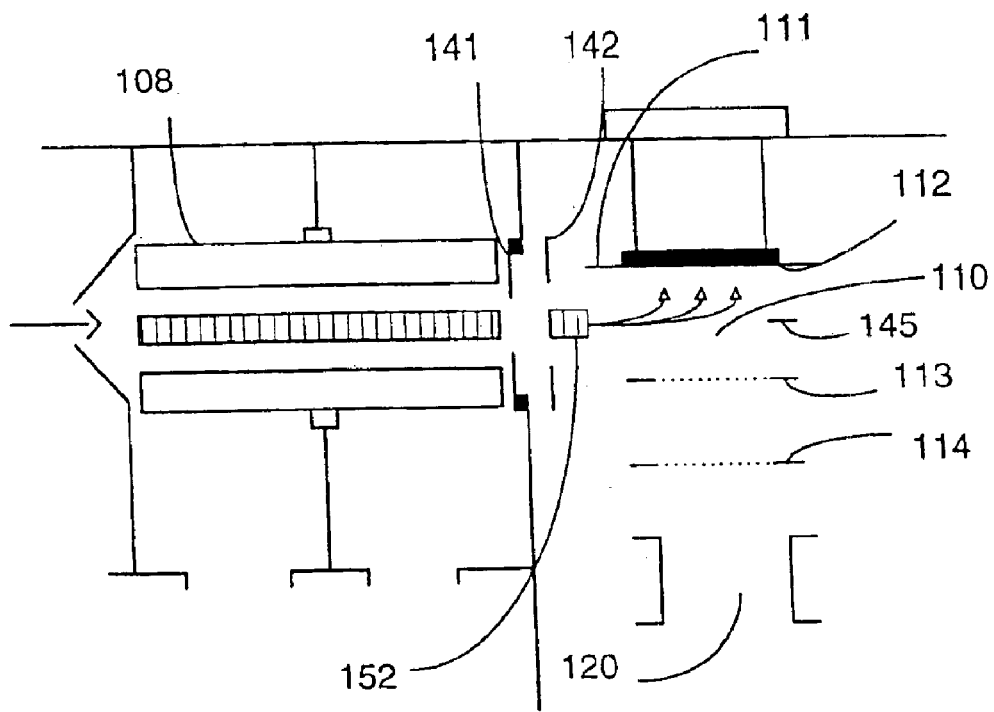
Figure 3C:
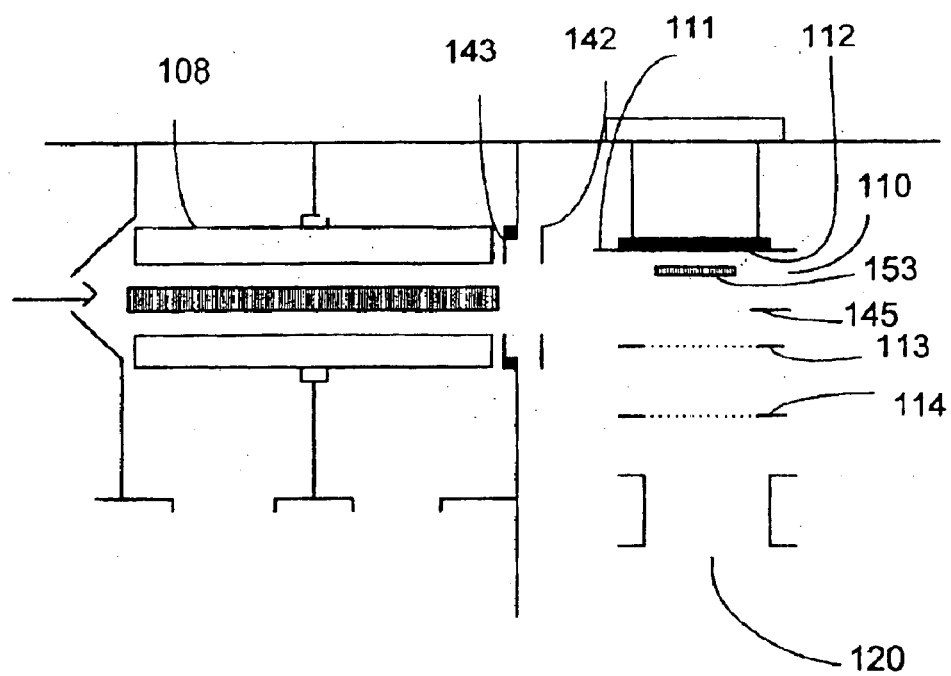
Figure 3D:
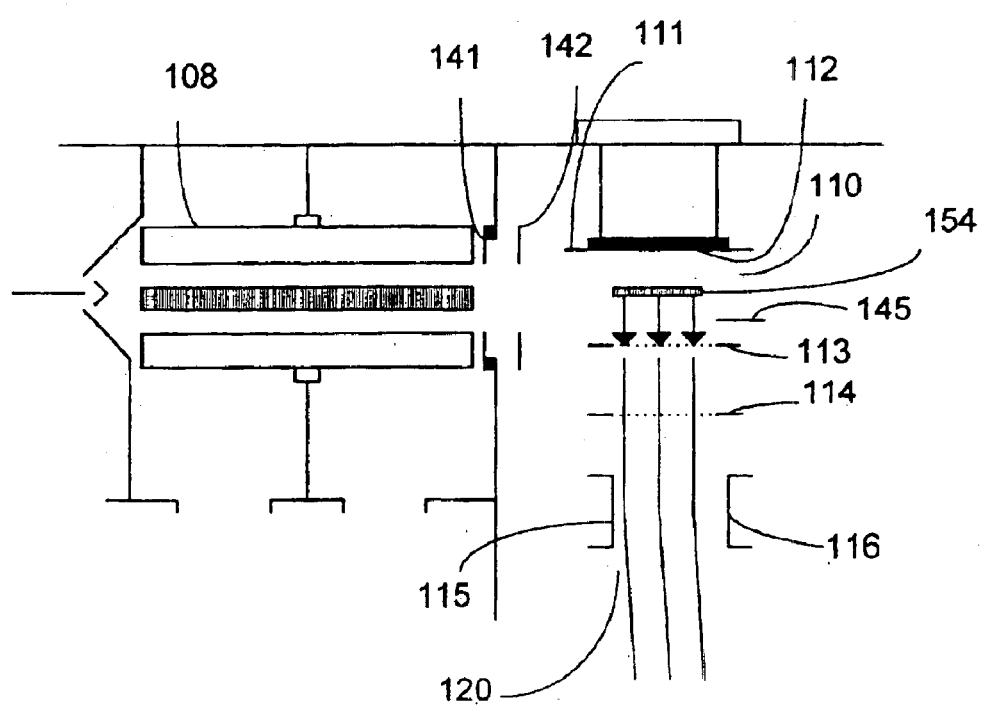

After applying a collecting or reverse electric field in pulsing region 10 for a set time period, the electric field is reversed in pulsing region 10. FIG. 2C shows the initial position of ion packet 55 comprised of ions or SID fragment ions located in a pseudo potential well near surface 12 just as the forward accelerating electric field is applied, and the RF field may or may not be turned off, in pulsing region 10. Referring to FIG. 2D, the applied forward ion accelerating electric field accelerates ion packet 56 from near surface 12 and directs the ions comprising ion packet 56 into Time-Of-Flight tube drift region 20. The ion trajectory may be altered by applying a non-zero electric field between steering electrodes 15 and 16. In this manner the ions comprising extracted ion packet 56 may be directed to impact on detector 22 or 23. In one embodiment of the invention, the timing and application of voltages to electrodes 41, 42, 11, 13, 15 and 16 are controlled by the configuration of power supplies, switches and controllers as diagrammed in FIG. 4.

Figure 4:
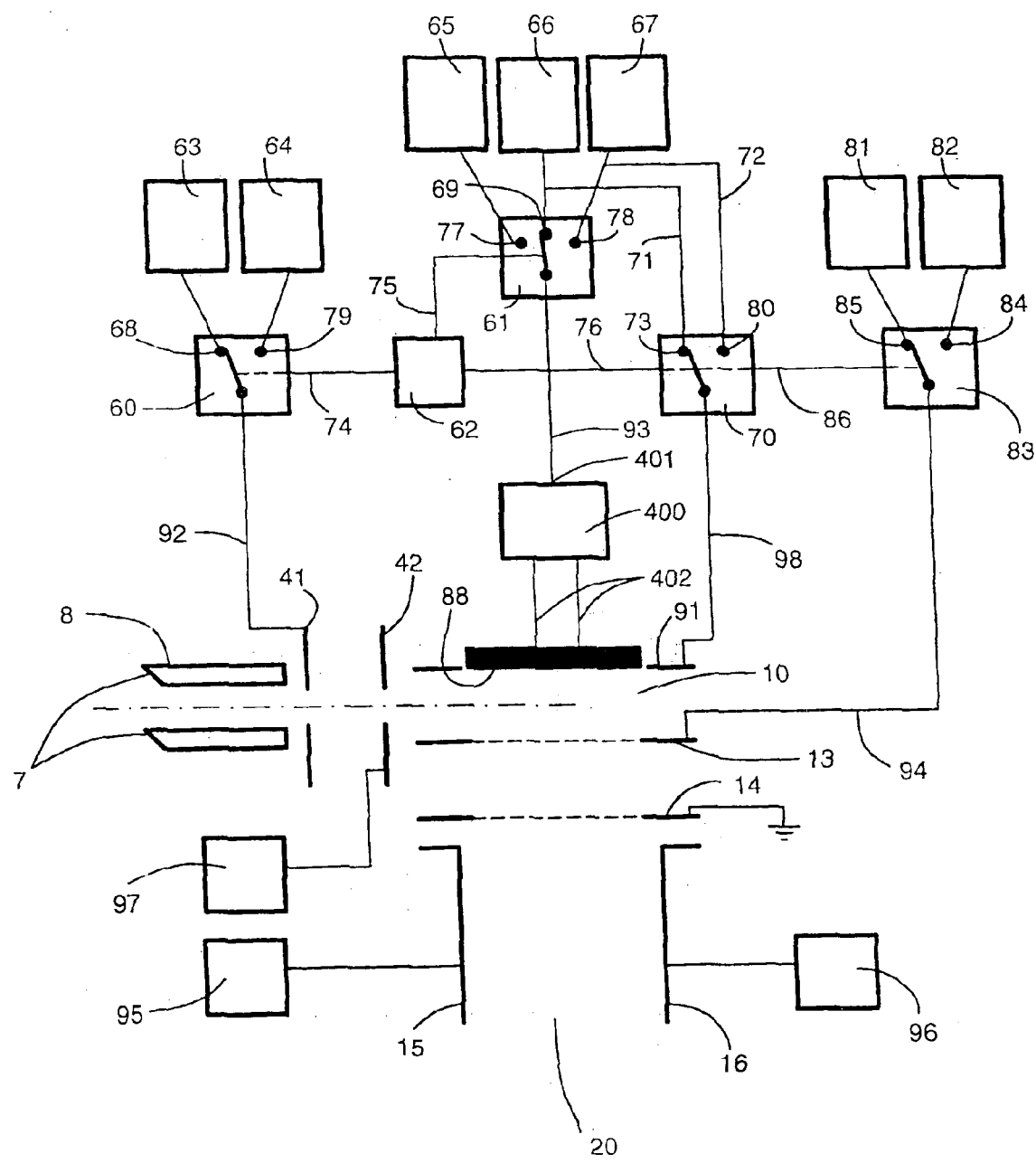
FIG. 4 is a diagram of one embodiment of the invention wherein multiple power supplies are switched to electrostatic lenses to allow collection of ions in a pseudo potential well in a TOF pulsing region and acceleration of said ions from the pulsing region of a Time-Of-Flight mass analyzer.
Figure 5A:
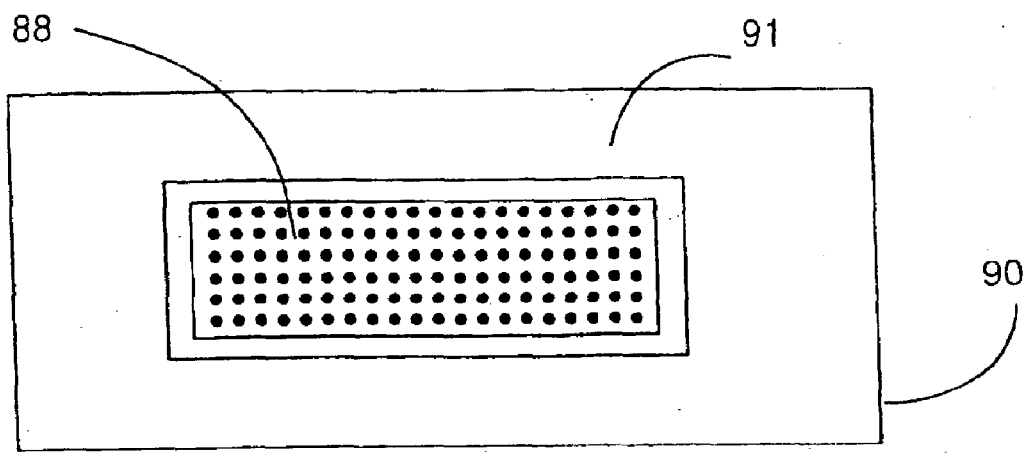
FIG. 5A is a top view diagram of one embodiment of an RF-field-generating surface, consisting of an array of wire tip electrodes in the plane of the surface, electrically insulated from a surrounding electrode.
Figure 5B:
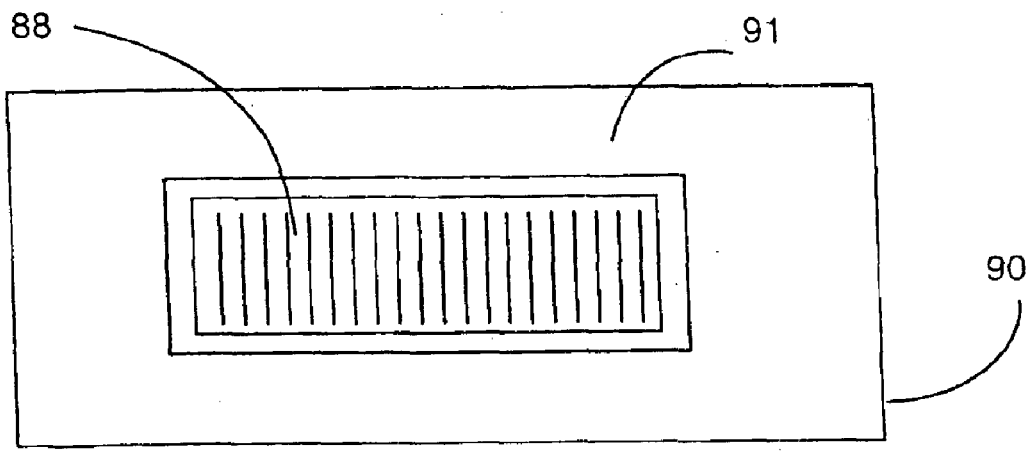
FIG. 5B is a top view diagram of one embodiment of an RF-field-generating surface, consisting of an array of parallel wires in the plane of the surface, electrically insulated from a surrounding electrode.
Figure 6:
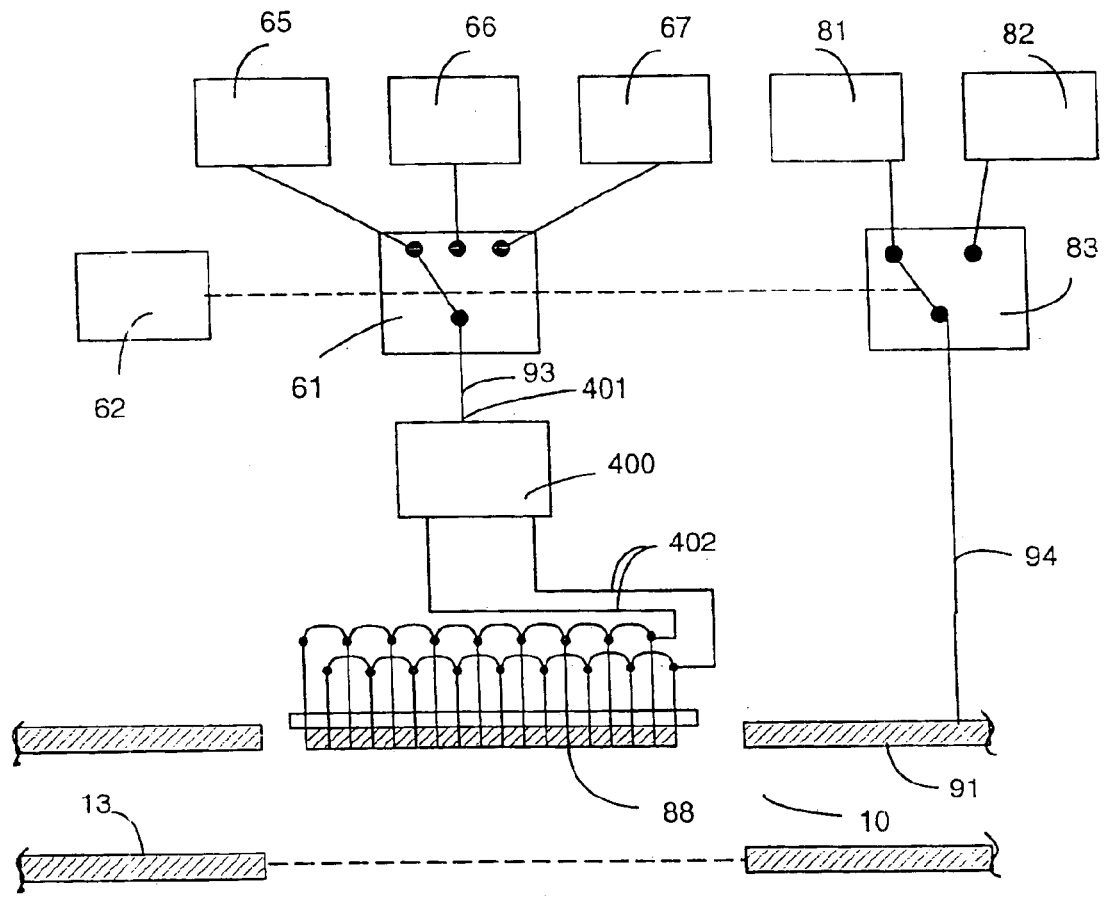
FIG. 6 is a side view diagram of a RF-field-generating surface composed of an array of wire tips, electrically separated by a dielectric, with power supplies, switches and control electronics.

One embodiment of the invention is shown in FIG. 4 where RF-field-generating surface 88 is electrically isolated from electrode 91 as diagrammed in FIGS. 5A, 5B, and 6. Surface 88 is formed in the embodiment illustrated in FIGS. 5A, 5B, and 6 by wires isolated from each other by a dielectric material. In FIGS. 5A and 6, surface 88 is formed by an array of wire tips, where the wires are oriented perpendicular to the surface 88. As illustrated in FIG. 6, neighboring wire tips are alternately connected to opposite phases of a high-frequency alternating voltage. The connection of the tips is alternated such that every other tip in both the horizontal or vertical directions of the grid is the same phase. FIG. 5B illustrates one alternative arrangement of the electrodes forming the RF-field-generating surface 88, in which wires are oriented lengthwise in the plane of the surface 88 and parallel to each other. In this configuration, every other wire is connected to the same phase, and neighboring wires are connected to opposite phases of the RF voltage. The surface of the dielectric material may coincide with the plane of the wires, or wire tips as illustrated in FIG. 6, or, alternatively, the surface of the dielectric may be located either below or above the plane of the wires or wire tips, depending on the most advantageous location for supporting surface-collected charge or not, and whether a surface coating of one type or another is employed.

With reference to FIGS. 4, 5A, 5B, and 6, the adjustable RF voltage output 402 from RF power supply 400 is connected to the RF-field-generating surface 88. Voltages provided by power supplies 65, 66 and 67 are selectively applied to the DC reference input 401 of RF power supply 400 through switch 61 and therefore the voltages provided by power supplies 65, 66, and 67 define the DC offset potential of RF generating surface 88. The outputs of power supplies 65, 66 and 67 are connected to switch poles 77, 69 and 78, respectively. The voltage applied to switch output 93 connected to the reference input 401 of RF power supply 400, is controlled by controller 62 through switch control line 75. Voltages from power supplies 66 and 67, connected through lines 71 and 72 to poles 73 and 80 respectively of switch 70 are selectively applied to electrode 91 through output 98 of switch 70. The voltage applied to electrode 91 is controlled by switch controller 62 through control line 76. Switch 60 applies voltages from power supplies 63 and 64, connected to poles 68 and 79 respectively, to switch output 92 connected to exit lens 41. Switch controller 62 sets the output of switch 60 through control line 74 to control the gating or release of trapped ions from multipole ion guide 8. Voltages from power supplies 81 and 82, connected to poles 85 and 84 respectively of switch 83 are applied to lens 13 through switch 83 output connection 94. The voltage applied to lens 13 is controlled by switch controller 62 through control line 86. In the embodiment shown, lens 14 is tied to ground potential and voltage is applied to lens 42 from power supply 97. Steering lenses 15 and 16 are connected to power supplies 95 and 96 respectively. In the embodiment of the invention diagrammed in FIG. 4, the potentials of lenses 42, 14, 15 and 16 remain constant during an ion collecting and extraction cycle as diagrammed in FIG. 2.

Switches 60, 61, 70 and 83 are synchronously controlled by switch controller and timer 62. The pole positions of switches 60, 61, 70 and 83, as diagrammed in FIG. 4 are set to allow the gating or release of trapped ions from ion guide 8. The voltages set on power supplies 63, 97, 66, and 81 connected to electrodes or lenses 41, 42, 88 with 91 and 13 respectively, optimize the initial release of ion packet 51 from ion guide 8 and transfer to pulsing region 10. After the gate ion release time period is over, controller 62 switches output 92 of switch 60 to power supply 64 through pole 79 to end the release of ions from ion guide 8. FIG. 2A illustrates the position of released ion packet 51 shortly after output 92 of switch 60 has been switched from power supply 63 to 64. Variations of trapping and releasing ions from ion guide 8 are described in U.S. Pat. No. 5,689,111 and these alternative means for ion trapping and release can be equally configured in the invention described herein. After an appropriate delay to allow the desired portion of ion packet 52 to move into position over surface 88 or 12 as shown in FIG. 2B, controller 62 switches output 93 from power supply 66 to 65 through switch 61. This switching of voltages changes the substantially neutral or zero electric field in pulsing region 10 to a reverse electric field that directs ions toward surface 88. For positive ions, the voltage applied from power supply 65 to surface 88 will be less, or more negative, than the voltage applied to electrodes 91 and 13. (While such a reverse electric field is described in this particular embodiment of the present invention as being generated by the reduction in voltage of surface 88 relative to the potentials of electrodes 91 and 13, it will be appreciated that an alternative approach is to increase the potentials of electrodes 91 and 13 relative the DC potential of surface 88, which also results in a reverse electric field that directs ions towards the surface 88.) Ions may or may not collide with surface 88 depending on the amplitude of the relative voltages applied to electrodes 13, 91 and surface 88, the amplitude of the RF voltage applied to surface 88, and the initial ion energy in the orthogonal direction prior to colliding with surface 88. Higher impact energy may be applied to cause surface induced dissociation or a lower energy impact may be set to allow energy-dissipating collisions of ions with surface 88. As shown in FIGS. 4, 5A, 5B, and 6, surface 88 may be configured as a subset of the total area of pulsing region electrode assembly 90.

During the reverse field or collecting step, the output of power supply 65 is applied as a bias DC potential directly to collecting surface 88. As diagrammed in FIGS. 4, 5A, 5B, and 6, electrode 91 and surface 88 of electrode assembly 90 are configured as a planar surface. Surface 88 is electrically isolated from electrode 91. The voltage applied to electrode 91 of electrode assembly 90 during the reverse field conditions can be set to be substantially equal to the voltage applied to lens of electrode 13. Alternatively, a voltage different from that applied to electrode 13 can be applied to electrode 91 to optimize the ion collection or fragmentation conditions during the collection step. Due to the electric field between surface 88 and lens portion 91, ions are directed substantially toward surface 88 during reverse field conditions. The size and position of surface 88 is configured to maximize the detection efficiency of ions accelerated from surface 88 into TOF tube drift region 20.

Referring to FIG. 4, output 93 is switched to power supply 65 to generate a reverse electric field for a desired time period. The collecting time period will vary depending on the field applied in pulsing region 10, the desired time for ions to spend in the pseudo potential well and whether it is desired to collect all ions initially positioned in the pulsing region or a portion of the ions prior to accelerating ions into Time-Of-Flight tube drift region 20. If surface 88 is coated with a self assembled monolayer (SAM) material or other dielectric material, ions allowed to collide with the surface may become trapped on the surface, and the space charge created by ions initially collected on surface 88 may prevent additional ions from colliding with the surface. Miller et. al., Science, Vol. 275, 1447, 1997, reported that an ion soft-landed (that is, with low impact energy) on an F-SAM surface remains intact without loss of charge for hours when kept under vacuum. The retention of ion charge on the surface can be desirable in some analytical applications. Some degree of space charging maintained on the surface facilitates the dissipation of energy and subsequent recoil of ions colliding with the surface under low-energy impact conditions because the space charge prevents the approaching ions from forming a bond with the surface. The collecting surface can be initially charged by conducting one or more initial surface collection cycles. Depending on the surface material used and the initial ions collected on the surface, such soft-landed ions may not release with the reversal of the collecting electric field in pulsing region 10. In this manner an effective surface space charge steady state can be reached which enables very high ion yield from each subsequent low-energy collision. Any small non-uniform field created by the space charge which would effect trajectories of ions traversing pulsing region 10 can be counteracted by applying the appropriate bias voltage to electrode 13 from power supply 81.

A forward accelerating field is applied in pulsing region 10 after the reverse or collecting field has been held for a period of time. The accelerating field accelerates ions in the pseudo potential well near surface 88 into Time-Of-Flight tube drift region 20. Referring to FIG. 4, the rapid application of a forward accelerating field is achieved by simultaneously switching the output of power supply 67 to collecting surface 88 and electrode 91 through switches 61 and 70 respectively and the output of power supply 82 to electrode 13 through switch 83. The accelerating field accelerates ions near surface 88 into Time-Of-Flight tube drift region 20. Switch 60 retains its state and the outputs of power supplies 97, 95 and 96 remain unchanged. The forward accelerating field applied in pulsing region 10, is maintained for a time period sufficient to allow the highest ion mass-to-charge of interest, to pass through the grid of ion lens 14 and into Time-Of-Flight tube drift region 20. After the applied forward acceleration field time period is complete, the controller simultaneously switches switch 83 from pole 84 to 85, switch 70 from pole 80 to 73, switch 61 from pole 78 to 69 and switch 60 from pole 79 to 68. This forms a substantially neutral field in pulsing region 10 and opens the gate to release ions from ion guide 8. This switch event begins a new ion gating, ion collection and TOF forward acceleration cycle. Controller 62, the power supplies and switches are configured to allow rapid rise time of the voltages applied to electrodes or lenses 41, 88, 91 and 13. The voltage rise time applied to electrodes 41, 88, 91 and 13 is generally less than 50 nanoseconds to achieve optimal Time-Of-Flight performance.

Variations to the ion collection and TOF pulsing cycle described can be configured by modifying the switching sequence and time delays as controlled by controller 62 to optimize performance for a given analytical application. For example, it may be desirable to configure more than one ion gating and collection cycle prior to accelerating ions into the time-of-flight drift region. Multiple gating and collection cycles may serve to accumulate ions in the pseudo potential well near surface 88 prior to extraction. Ion collection cycles can be mixed with SID steps prior to ion extraction. In all configurations of the invention, ions with either positive or negative polarities can be directed toward surface 88 with the appropriate polarity electric field applied in pulsing region 10. Similarly, the appropriate polarity electric field can be applied to extract positive or negative ions collected near surface 88 and accelerate said ions into Time-Of-Flight tube drift region 20. Surfaces 88 can be configured to be automatically replaced without breaking vacuum. With automated exchange from a set of RF voltage generating surfaces, a given material coating the RF generating surface can be rapidly configured to optimize performance for a given application. When the vacuum is vented, a single or a set of RF-voltage generating surfaces with or without surface coatings can be removed and reinstalled manually by removal and reinstallation of vacuum flange assembly 49.

Another embodiment of the invention is diagrammed in FIG. 3. Ions from a continuous beam enter pulsing region 110 from a substantially orthogonal direction while a reverse electric field is applied between electrode or lens 113 and electrode 111 and RF-generating surface 112. As shown in FIG. 3A, ions comprising continuous primary ion beam 150 enter pulsing region 110 from multipole ion guide 108 and are directed toward surface 112 in the presence of this reverse electric field. Ions are accumulated in a pseudo potential well near surface 112 for a period of time after which additional ions are prevented from entering pulsing region 110 as diagrammed in FIG. 3B. Continuous beam 150 can be stopped by applying a retarding or trapping potential to exit lens 141 which prevents ions traversing multipole ion guide 108 from exiting through exit lens 141. FIG. 3B illustrates the breaking of continuous beam 150 by applying a trapping potential to exit lens 141 and/or a combination of lens 141 and 142. The ions in truncated primary ion beam 152 continue into pulsing region 110 and are directed toward surface 112. When the ions in pulsing region 110 have been collected in the pseudo potential well near surface 112, as represented by ion packet 153 in FIG. 3C, a forward accelerating electric field is applied between surface 112 with electrode 111 and electrode 113, with or without simultaneously shutting off the RF field. The forward accelerating electric field extracts ions in ion packet 153 from the pseudo potential well near surface 112 and released ion packet 154 is accelerated through the grids of electrodes of lenses 113 and 114 into Time-Of-Flight tube drift region 120 as diagrammed in FIG. 3D. Voltages can be applied to steering lenses 115 and 116 to steer the direction of the ions as ion packet 154 moves into Time-Of-Flight drift region 120. In the continuous beam embodiment of the invention as diagrammed in FIG. 3, ions are trapped or accumulated in pseudo potential well near surface 112 with less time spent per cycle trapping ions in ion guide 108. High duty cycle can be achieved with this continuous beam embodiment of the invention because few ions are lost throughout the ion collection in the pseudo potential well and extraction cycle. This is an alternative to the embodiment of the invention as diagrammed in FIG. 2, wherein more time is spent accumulating or trapping ions in ion guide 8 prior to collection in pseudo potential well near surface 12. One embodiment or the other may yield optimal performance depending on the analytical application.

Electrode 145 may be added to pulsing region 110 as shown in FIG. 3 to provide a retarding potential to the primary ion beam. The kinetic energy, primarily in the axial direction, of ions in primary beam 150 as they enter pulsing region 110 is set by the voltage difference between the ion guide offset potential and the average field applied to electrodes 111 and 113 traversed by the primary ion beam. A voltage may be applied to electrode 145 to reduce the primary ion beam axial velocity as the ions traverse pulsing region 110. For the dissipation of ion kinetic energy by low-energy collisions with the RF-generating surface, it may be desirable to reduce the ion impact energy on the surface. The ion impact energy on the surface is a function of the primary beam axial velocity component and the orthogonal component due the reverse field applied in pulsing region 110. Configuring electrode 145 to retard the primary ion beam axial velocity component allows more precise control of the ion impact energy with surface 112. Reducing the primary ion beam energy as it enters region 110 by lowering the potential of the ion guide offset relative to that of electrodes 111 and 113 is disadvantageous in that this method reduces the ability to shape and direct the primary ion beam it enters pulsing region 110. Local fringing fields present in the path of the primary ion beam path prior to entering pulsing region 110 have a more pronounced and detrimental effect on focusing of the primary ion beam when the ion kinetic energy is reduced below a few tenths of 1 eV. Applying a retarding potential to electrode 145 during collection of ions on surface 112 allows the setting of the initial primary beam kinetic energy sufficiently high to achieve efficient transport from ion guide 108 into pulsing region 110. The potential applied to Electrode 145 provides an additional degree of control of the ion impact energy on surface 112 independent of the primary ion beam energy as it enters region 110. When a forward accelerating potential is applied in pulsing region 110, the appropriate voltage is applied to electrode 145 to match the field that would appear at its position were it not present. With such a potential applied during ion acceleration into TOF tube drift region lens 145 does not distort the optimal accelerating field established by potentials applied to electrode 111, surface 112 and electrode 113.

Electrode 145 can also be configured as a surface composed of an RF-field-generating array of electrodes similar to that of surface 112. Therefore, a pseudo potential barrier is formed at the far end of the pulsing region, which prevents loss of ions in this area. Similarly, an RF-field-generating surfaces can be configured on the pulsing region side of electrode 142 in order to prevent ions trapped in the pseudo potential well near surface 112 from escaping past the area of pulsing region 110 that is near the electrode 142. Other electrodes may be placed along other periphery areas bordering the pulsing region with any combination of static and RF electric fields so as to prevent ions trapped in pseudo potential well near surface 112 from escaping. Appropriate DC biases can be applied to these additional electrodes during the TOF acceleration period to minimize distortion of the acceleration field in pulsing region 110 during ion acceleration into the TOF drift region.

The power supply and voltage-switching embodiment shown in FIG. 4 can be configured to control the continuous ion collection and extraction sequence diagrammed in FIG. 3. Replaceable surface 112 and electrode 111 can be configured as diagrammed in FIGS. 4, 5A, 5B, and 6, and as described for the embodiment of the invention diagrammed in FIGS. 2 and 3. In particular, surface space charge formed from ion accumulation on a dielectric or a Self Assembled Monolayer surface can be used to prevent ions from physically contacting the surface during collisions with the surface prior to acceleration into Time-Of-Flight tube 120. It is preferable to maintain the magnitude of the surface space charge at a reproducibly low level to minimize the effect of the space charge repelling force on an accelerated ion flight time.

An alternative embodiment of the invention includes an alternative to the configuration of surface 88 in FIGS. 4, 5A, 5B, and 6. Surface 88 may be coated with an appropriate matrix material, as is known in the art, to enable Matrix Assisted Laser Desorption Ionization (MALDI) of ions collected on surface 88. Ions produced from an external ion source can be collected on surface 88 if the interaction between ions colliding with the surface, as described above, is strong enough so as to retain the ions on the surface, rather than allowing the ions to recoil with reduced kinetic energy. A laser pulse with the optimal wavelength, power and duration is directed to impinge on collecting surface 88 to produce MALDI generated ions. The MALDI produced ions can then be accelerated into the Time-Of-Flight tube with or without delayed extraction. The delay in applying the acceleration pulse relative to the laser pulse allows the Maldi-generated neutral gas plume to dissipate. Alternatively, the MALDI ions produced by one or more laser desorption pulses can be accumulated in pseudo potential well near surface 88, as described above. The accumulated MALDI produced ions can be directed to collide with surface 88 with low impact energy so as to dissipate kinetic energy and reduce spatial and velocity distributions in the pseudo potential well, as described previously, prior to pulsed acceleration into the TOF drift region, resulting in improved mass resolving power and mass accuracy. The accumulated MALDI ions can also be directed to collide with surface 88 with high energy so as to create SID fragment ions, which can subsequently be accelerated into the TOF drift region, or be accumulated in pseudo potential well above surface 88 prior to collisional cooling or acceleration into the TOF drift region. If the external source is an Electrospray ionization source interfaced on-line to a liquid chromatography (LC) system, ions generated from the ES source are delivered to the collecting surface in the Time-of Flight pulsing region. The ions may be soft-landed or accelerated to the collecting surface with sufficient energy to cause surface induced dissociation fragmentation. The surface collected ion population may or may not be neutralized depending on the MALDI matrix material used. A laser pulse impinging on the collection surface releases ions and/or re-ionizes surface neutralized ions prior to acceleration of the product ions into the Time-Of-Flight tube drift region. Combining surface collection of API source generated ions with subsequent MALDI of said surface collected ions and surface neutralized molecules, allows MALDI mass spectra to be generated on line from LC or capillary electrophoresis (CE) separations. A Time-Of-Flight mass analyzer can be configured according to the invention whereby ES and MALDI mass spectra can be alternatively generated on-line during an LC-MS or a CE-MS run. MALDI generated ions of higher molecular weight generally have fewer charges than ES generated ions from the same compounds. Depending on the configuration of the collection surface material, multiply charged ions produced by ES ionization may have a reduction in the number of charges per ion on impact with the collecting surface. Charge reduction may be desirable in some applications as it spreads ion peaks out along the mass to charge scale, reducing peak density.

One aspect of the invention is configuration of heating or cooling of surface 88 as diagrammed in FIG. 5A or 5B. Cooling of surface 88 can aid in the condensing of more volatile ions on the surface prior to MALDI. A reduced surface temperature may also aid in slowing down chemical reactions at the surface or decrease the rate of ion charge exchange with the surface. Heating surface 88 can aid in the release of ions from the surface when a forward accelerating field is applied. Surface to ion reaction rates may be enhanced by heating the collecting surface in selected applications. Thermal fragmentation of ions can occur when ions land on a heated surface. Temperature cycling of the surface 88 during sample introduction to an API source can add a useful variable to surface reaction studies with subsequent Time-OF-Flight mass to charge analysis.

Figure 7A:
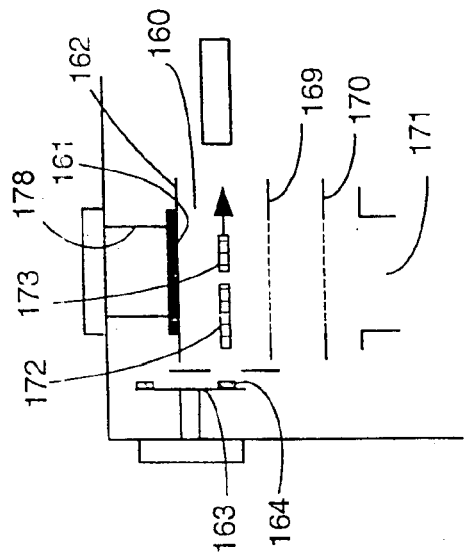
FIGS. 7A through 7D diagram one embodiment of the invention wherein, ions produced by Matrix Assisted Laser Desorption Ionization external to the pulsing region of a time-of-flight mass analyzer are collected in a pseudo potential well near a surface in the pulsing region prior to accelerating the ions into the flight tube of a Time-Of-Flight mass analyzer.
Figure 7B:
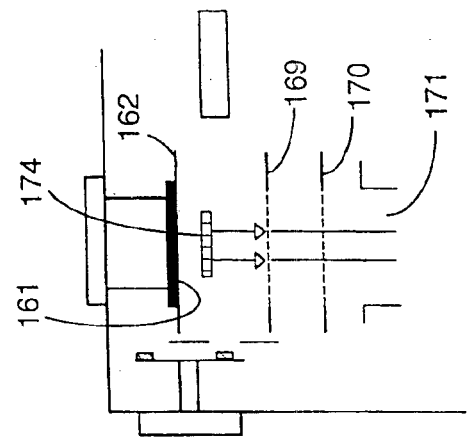
Figure 7C:
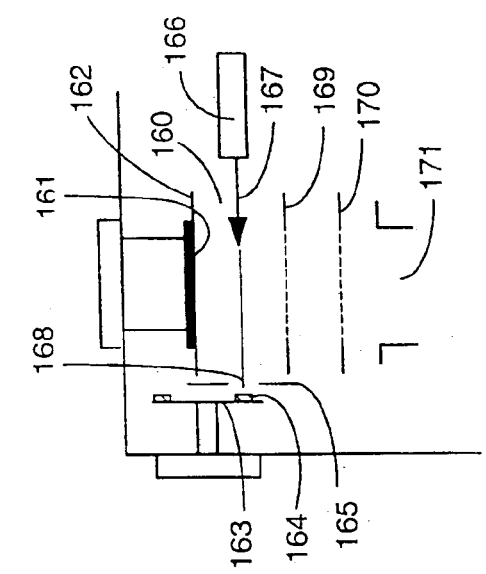

An alternative embodiment of the invention is diagrammed in FIGS. 7A through 7D. Referring to FIGS. 7A and 7B, ions produced in vacuum from an ion source located outside Time-Of-Flight pulsing region 160 are directed into pulsing region 160 and collected in pseudo potential well near surface 161. As an example of an ion source which produces ions in vacuum, FIG. 7 diagrams a Laser Desorption (LD) or Matrix Assisted Laser Desorption Ionization source mounted in the Time-Of-Flight vacuum region such that ions produced from a laser pulse are directed into Time-Of-Flight pulsing region 160. Removable multiple sample stage 163 positions sample 164 in line with laser pulse 167 generated from laser 166. In the embodiment shown, sample stage assembly 163 is configured whereby the position of sample 164 relative to laser pulse 167 can be adjusted to achieve maximum sample ion yield per laser pulse. Ions released from sample 164 due to an impinging laser pulse, are extracted with an extraction or accelerating potential applied between sample stage 163 and electrode or lens 165. Alternatively, delayed ion extraction from region 168, between electrode 165 and sample surface 164, can be achieved when a neutral field or a weak retarding field is applied for a period of time during and subsequent to the laser pulse hitting sample surface 164. After the delayed extraction time period, the ion extracting electric field is applied to region 168 between electrode 165 and sample stage 163 to accelerate ions from region 168 into pulsing region 160. Whether the ions are extracted from region 164 with a constant accelerating field or subsequent to a delayed extraction time period, the ions are accelerated into Time-Of-Flight pulsing region 160 with the ion packet primary velocity component oriented in a direction substantially parallel to the surface of lens or electrode 169. In the embodiment diagrammed in FIG. 7B, MALDI generated ions from sample 164 enter pulsing region 160 with trajectories generally orthogonal to the axis of Time-Of-Flight drift region 171.

Figure 7D:
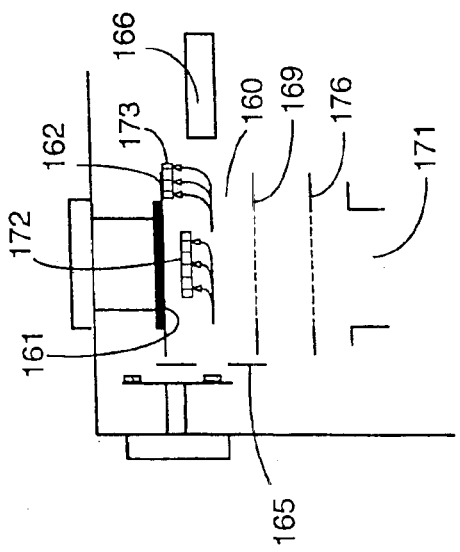

A substantially neutral electric field is maintained in pulsing region 160 as the ions produced from laser pulse 167 traverse the pulsing region. The ions produced from laser pulse 167 and accelerated into pulsing region 160 are diagrammed as ion packets 172 and 173 in FIG. 7B. Ion packet 173 is comprised of the lower mass to charge ions, such as matrix related ions, created by laser pulse 167 impinging on sample 164. The lower mass to charge ions in ion packet 173 have a higher velocity component after acceleration into region 160 than the higher mass to charge ions comprising ion packet 172. Ions of different mass to charge experience some degree of Time-Of-Flight separation as they traverse pulsing region 160. After a selected time period subsequent to laser pulse 167, a reverse electric field is applied in Time-Of-Flight pulsing region 160 to direct the MALDI generated ions comprising ion packets 172 and 173 to move towards pseudo potential well near surface 161 and electrode 162. The time delay prior to initiating collection can be chosen such that undesired lower mass to charge ions have time to move beyond pulsing region 160 when the reverse electric field is applied. As diagrammed in FIG. 7C, higher mass to charge ions from ion packet 172 are collected in pseudo potential well near surface 161 while the lower mass to charge ions form ion packet 173 impact on electrode 162 and are not collected in pseudo potential well near surface 161. Alternatively, the amplitude and/or the frequency of the RF-field generated above surface 161 can be adjusted so as to allow lower mass ions below the "cut-off" mass to charge, as determined by the amplitude and frequency of the RF-field, to pass through the RF-field and be eliminated from the ion population. When the reverse field has been applied for a time period sufficient to collect ions in pseudo potential well near surface 161, a forward accelerating electric field is applied in pulsing region 160 between electrode 169 and surface 161 and electrode 162. As shown in the diagram of FIG. 7D, the forward ion accelerating field accelerates ions that are collected in pseudo potential well near collecting surface 161 into Time-Of-Flight drift tube region 171.

The voltage switching sequence described for the MALDI ionization step, ion acceleration into pulsing region 160, collection of ions in the pseudo potential well and subsequent acceleration of collected ions into Time-Of-Flight tube drift region 171, is similar to that described for the embodiment of the invention described in FIGS. 2 and 4. Individual power supply outputs can be applied to electrodes or lenses 163, 165, 162, surface 161, and 169 through switches synchronized with a switch controller with timer. Ions can be accumulated in pseudo potential well near surface 161 from one or more MALDI pulses prior to accelerating the collected ions into Time-Of-Flight drift region 171. Depending on the surface material selected for coating of surface 161, surface space charge can be used to prevent incoming ions from touching the surface during low-energy collisions, facilitating the dissipation of kinetic energy of the ions through collisions with the surface, and subsequent ion collection and acceleration into Time-Of-Flight tube drift region 171. The coating of removable RF-generating surface 161 can be comprised of but not limited to conductive, insulating, Self Assembled Monolayer, semiconductor or piezo materials. RF-generating surface holder assembly 178 can be configured to allow automatic changing of surface 161 without breaking vacuum. Surface coating materials for surface 161 can be switched to present the optimal surface for kinetic energy dissipation/recoil, fragmentation or accumulation for a given application.

By adjusting the reverse electric field strength in pulsing region 160, MALDI produced ions can be directed to surface 161 with energy sufficient to cause surface induced dissociation or with low enough energy to result in minimal fragmentation. Controlled SID ion fragmentation can be achieved for MALDI generated ions by selection of the relative voltage applied between electrode 169 and electrode 162 and surface 161. MALDI generated ions moving from region 168 to surface 161 will spend sufficient time traversing pulsing region 160 to exhaust fast ion fragmentation processes that occur in MALDI ionization. Collection of MALDI generated ions in a pseudo potential well near surface 161 reduces the chemical noise appearing in MALDI TOF mass spectra due to fast ion fragmentation processes that occur in MALDI ionization. With collection of MALDI generated ions, ion fragmentation processes will be completed prior to accelerating the collected ions into Time-Of-Flight tube drift region 171. This results in higher resolving power over a wider mass to charge range and easier to interpret mass spectra. All MALDI produced ions can be collected in a pseudo potential well near surface 161, if it is not desirable to eliminate ions in portions of the mass to charge scale. Lower mass to charge ions generated from the MALDI matrix may be eliminated using reverse field delayed extraction techniques in region 168 or with Time-Of-Flight separation in pulsing region 160 prior to collection as was described above. Analogous to the embodiment diagrammed in FIG. 3, MALDI produced ions can be continuously collected by the continuous application of a reverse and a retarding electric field in pulsing region 160 during the time period when MALDI produced ions are accelerated from region 16B into pulsing region 160. In this manner, all MALDI produced ions are collected in the pseudo potential well near surface 161 prior to being accelerated into Time-Of-Flight tube drift region 171.

Figure 8:
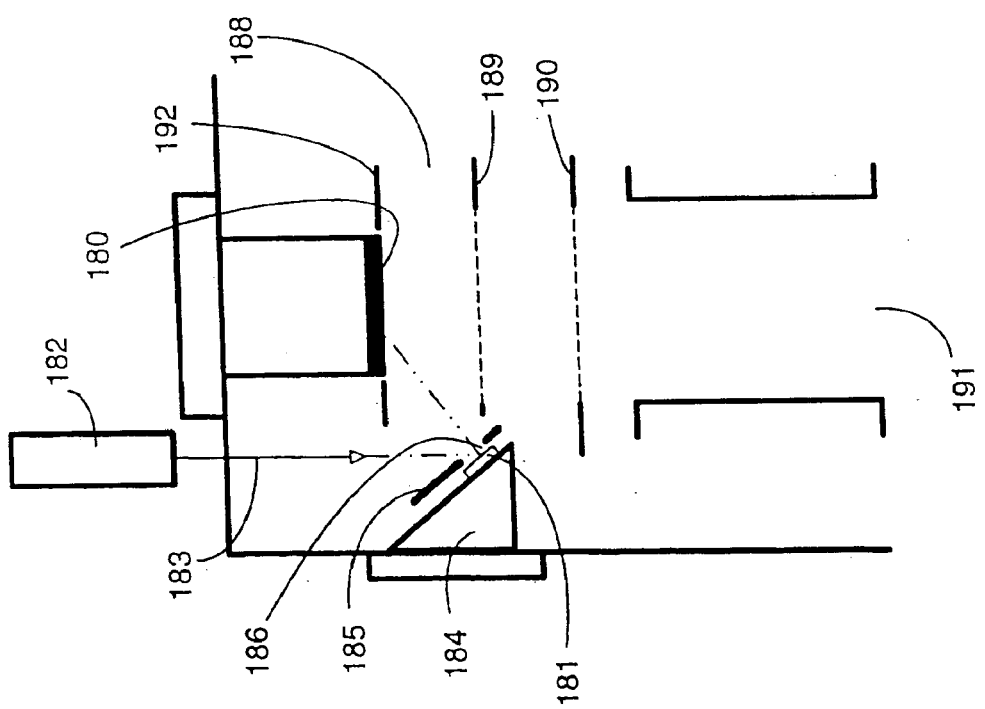
FIG. 8 is a diagram of one embodiment of the invention wherein ions are produced from a position above the RF-field-generating surface and pseudo potential well in the pulsing region of a Time-Of-Flight mass analyzer.

Any vacuum ion source can be substituted for the Laser Desorption or MALDI ion source diagrammed in FIG. 7 where ions enter pulsing region 160 with a trajectory substantially orthogonal to the Time-Of-Flight tube axis. Alternatively, ions produced from atmospheric pressure ion sources or vacuum ion sources can be configured such that the ions produced, need not be directed into Time-Of-Flight pulsing region 10, 110 or 160 with a trajectory that is substantially orthogonal to the Time-Of-Flight tube axis. Alternative embodiments of the invention are diagrammed in FIGS. 8 and 9 wherein a MALDI ion source is configured such that the sample surface is positioned in front and behind RF-field generating surfaces 180 and 212 respectively. Referring to FIG. 8, laser pulse 183 from laser 182 is directed onto sample 181 mounted on removable sample holder 184. Ions produced from laser pulse 182 are accelerated from region 186 into pulsing region 188 by applying the appropriate voltage, with or without delay extraction, to electrode 185. The MALDI generated ions pass through pulsing region 188 and are collected on replaceable RF-field generating surface 180. Ions collected in the pseudo potential well near surface 180 are subsequently extracted from the pseudo potential well near surface 180 and accelerated into Time-Of-Flight tube drift region 191. Analogous to the continuous ion beam collection sequence diagrammed in FIG. 3, a reverse electric field is maintained between electrode 189 and surface 180 and electrode 192 to direct ions accelerated from region 186 toward pseudo potential well near surface 180. Ions produced from laser pulse 183 can be immediately accelerated into pulsing region 188 or the ions produced can be accelerated into pulsing region 188 after a delayed extraction period. Direct acceleration or delayed extraction from region 186 is controlled by the voltage applied to lens 185 relative to the voltage applied to electrically isolated sample holder 184 during and subsequent to the impinging of laser pulse 183 on sample 181. Ions collected in pseudo potential well near surface 180 are extracted from the pseudo potential well near surface 180 and accelerated through lenses 189 and 190 into Time-Of-Flight tube drift region 191 by applying a forward accelerating field between electrodes 189 and surface 180 and electrode 192 in Time-Of-Flight pulsing region 188. The RF field may or may not be turned off during the forward ion acceleration period. Multiple laser pulse and collecting steps may precede an ion accelerating pulsing into Time-Of-Flight tube drift region 191.

Figure 9:
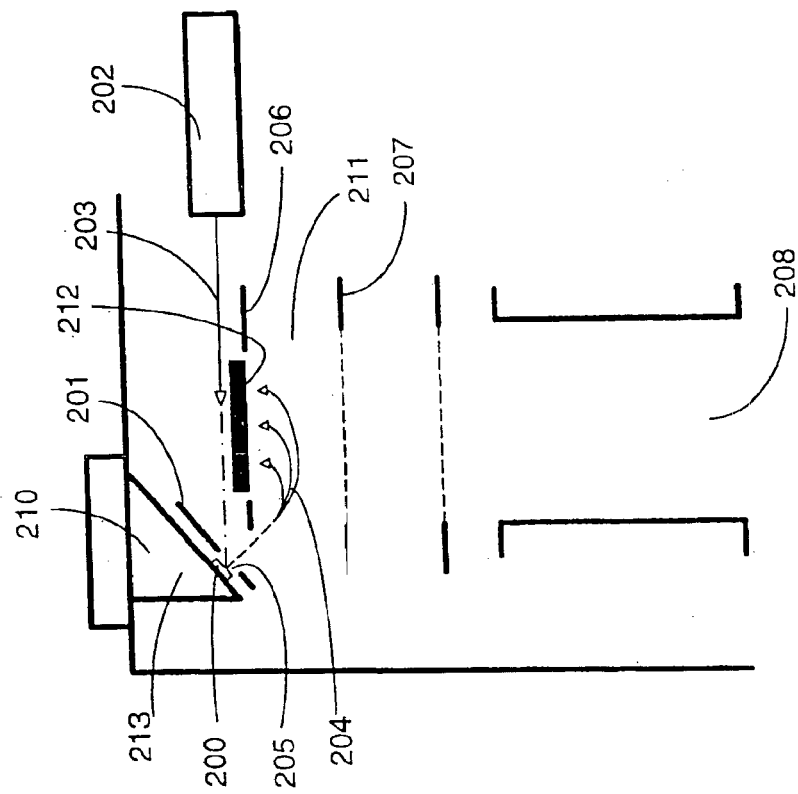
FIG. 9 is a diagram of one embodiment of the invention wherein ions are produce from an initial position behind the RF-field-generating surface and pseudo potential well in the pulsing region of a time-of-flight mass analyzer.

An alternative ion source mounting configuration is diagrammed in FIG. 9 wherein a MALDI ion source is positioned behind RF-field generating surface 212. Laser pulse 203 produced from laser 202 impinges on sample 200 mounted on removable sample holder 210 releasing ions into region 205 above the sample surface. Ions located in region 205 are accelerated, with or without delayed extraction, into Time-Of-Flight pulsing region 211 by applying the appropriate voltages to electrode 201 and sample holder 210. A reverse electric field is applied between electrode 207 and RF-field generating surface 212 and electrode 206 in pulsing region 211 to direct ion trajectories toward RF-field generating surface 212. Ions directed toward RF-field generating surface 212 will form reversing curved trajectories 204 prior to approaching or impacting on RF-field generating surface 212. In this embodiment of the invention, the relative positions and geometries of ion source 213 and Time-Of-Flight pulsing region 211 with RF-field generating surface 212 can be configured in a manner that a spatial dispersion of ions can occur across the plane of RF-field generating surface 212 based on the initial ion energy and trajectory. This ion surface position dispersion can be used to selectively eliminate a portion or portions of the initially produced ion population from being captured in the pseudo potential well above surface 212, and therefore prevented from being subsequently accelerated into Time-Of-Flight tube drift region 208. Depending on the size of the region of surface 212 that generates the RF field above it, ions of only a selected initial ion energy and trajectory will be trapped prior to acceleration into Time-Of-Flight tube drift region 208. Initial ion energy can be selected by setting the appropriate electric fields in regions 205 and 211 during the pseudo potential well trapping period.

Figure 10:
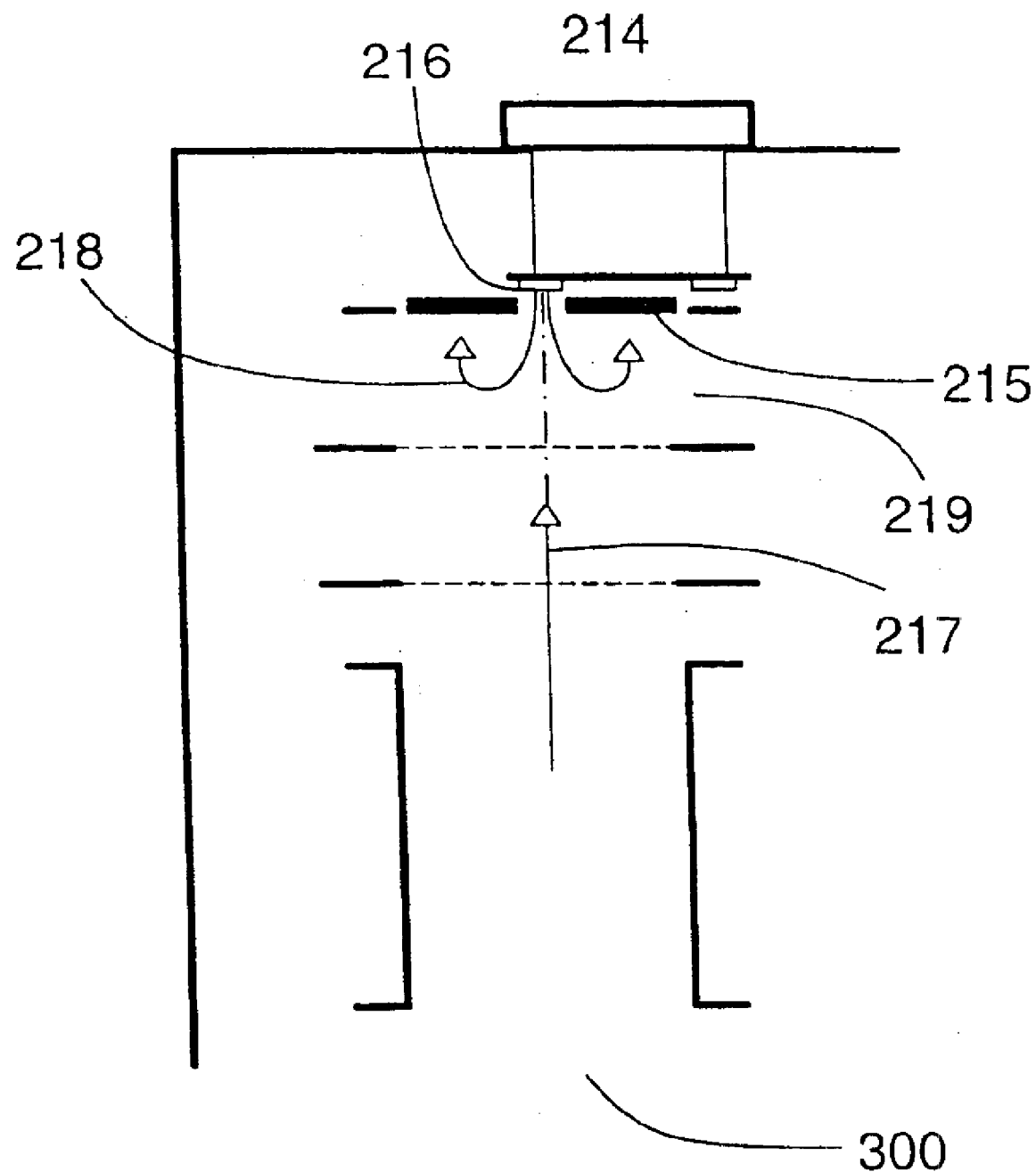
FIG. 10 is a diagram of one embodiment of the invention wherein ions produced by MALDI ionization are directed through an orifice in the RF-field-generating surface.

As diagrammed in FIG. 10, sample surface 216 can alternatively be positioned behind but parallel with RF-generating surface 215. RF-generating surface 215 configured with an orifice positioned over sample 216 serves as the ion extracting electrode. In the embodiment diagrammed in FIG. 10 the laser is configured to direct laser pulse 217 up the TOF tube to impinge sample 216, producing MALDI generated ions. MALDI generated ions entering pulsing region 219 through orifice 214 in RF-generating surface 215 are reflected back toward RF-generating surface 215 by applying a reverse electric field in pulsing region 219. Ions collected in pseudo potential well above surface 215 are subsequently accelerated into the Time-Of-Flight tube drift region by applying an accelerating field in pulsing region 219.

Another embodiment of the invention, as diagrammed in FIGS. 11A through 11D, is the configuration of a vacuum ion source that generates ions by Electron Ionization (EI) in Time Of-Flight pulsing region 231 with subsequent collection of the produced ions in a pseudo potential well above surface 220. Ions collected in pseudo potential well near surface 220 are then pulsed into Time-Of-Flight tube drift region 230 where they are mass to charge analyzed. Referring to FIG. 1A, sample-bearing gas 229 is introduced into Time-Of-Flight pulsing region 231 through gas inlet tube 223. The neutral gas may be the output of a gas chromatography column that is introduced into the vacuum maintained in pulsing region 231. Pulsing region 231 and Time-Of-Flight tube drift region may be configured in different vacuum pumping stages in this embodiment of the invention to maintain the required vacuum pressures in Time-Of-Flight tube drift region 230 while allowing gas pressures greater than $1 \times 10^{-5}$ torr in pulsing region 231. The pressure in pulsing region 231 can be decreased by configuring a pulsed gas inlet valve with gas pulsing synchronized with electron bombardment ionization, collection in a pseudo potential well above surface 220, and Time-Of-Flight pulsing cycles. A continuous neutral gas source can be used if the pressure in pulsing region 231 is maintained sufficiently low to avoid ion to neutral collisions during ion acceleration from the pseudo potential well near surface 220 into Time-Of-Flight tube drift region 230.

Figure 11A:
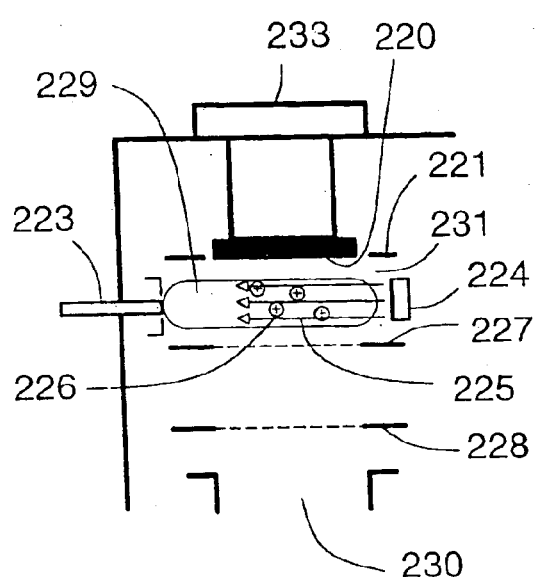
FIGS. 11A through 11D diagram one embodiment of the invention wherein ions produced by electron ionization in the pulsing region of a Time-Of-Flight mass analyzer are collected in a pseudo potential well near a surface prior to acceleration into the flight tube of a Time-Of-Flight mass analyzer.
Figure 11B:
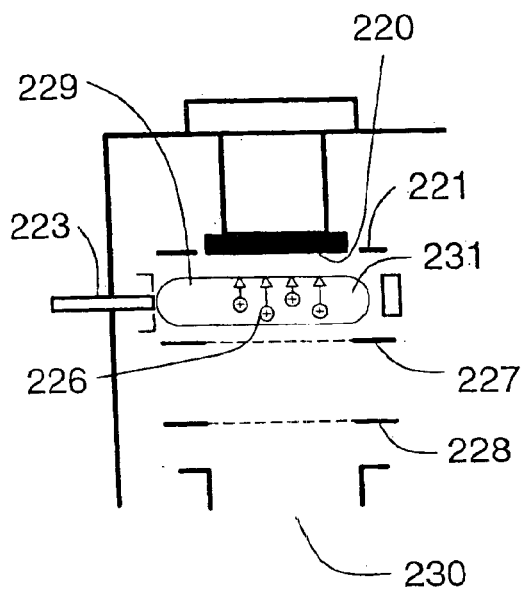

Sample bearing neutral gas from a continuous or pulsed gas source introduced into pulsing region 231 is ionized by electron beam 225, generated from filament and repeller assembly 224. Electron beam 225 is accelerated into pulsing region 231 when the electric field between electrode 227 and surface 220 and electrode 221 is maintained substantially neutral. After a selected ionization time period, electron beam 225 is turned off and ions 226 formed in pulsing region 231 are directed toward RF-generating surface 220 by applying a reverse electric field between electrode 227 and RF-generating surface 220 and electrode 221. A pulsed gas source may be closed during the period that ions are collected in pseudo potential well above surface 220. FIG. 11B diagrams the acceleration of ions 226 towards surface 220 when a reverse electric field is applied in pulsing region 231. Ions can be accelerated toward surface 220 with energy sufficient to cause the ions by pass through the pseudo potential well and collide with the surface 220, causing surface induced dissociation, by applying the appropriate reverse electric field in pulsing region 231. Alternatively, ions can be directed to collide with surface 220 with low energy impact with lower reverse fields applied for dissipating kinetic energy of the ions. Analogous to the apparatus and ion collecting methods described for FIGS. 2, 3, 4, 5 and 6, RF-generating surfaces may be coated with materials comprised of but not limited to conductive, dielectric, semiconductor, multilayer, Self Assembled Monolayer or piezo electric materials. The RF-generating surface mounted to vacuum flange 233 is removable and can be configured as part of assembly 90 as diagrammed in FIGS. 5A and 5B. The voltages applied to electrodes 221, 227 and 228 and RF-generating surface 220 can be controlled by a power supply and switch configuration similar to that diagrammed in FIG. 4. The controller and timer may also be configured to switch the gas inlet pulsing valve that controls the flow of gas through gas inlet 223. When the EI source configured in FIG. 11 is operated such that a space charge occurs on RF-generating surface 220, ions can collide with RF-generating surface 220 without being retained on surface 220. This method of operation facilitates the dissipation of kinetic energy of the ions prior to being trapped in pseudo potential near surface 220 before the ion accelerating field is applied in pulsing region 231.

Figure 11C:
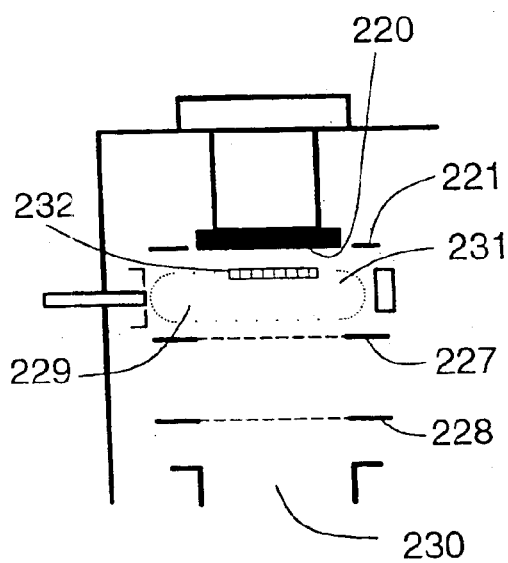
Figure 11D:
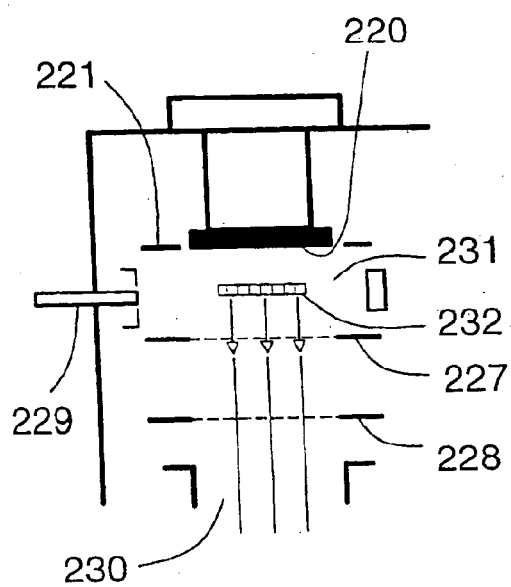

When operating with a gas pulsing valve, ions 232 can be held in the pseudo potential well near the RF-generating surface for a period of time to allow a portion of the residual neutral gas in pulsing region 231 to pump away after the ion collection step. This increases the mean free path and minimizes ion to neutral collisions when the ions are accelerated from surface 220 into the Time-Of-Flight tube drift region for mass to charge analysis. However, this delay also allows collisions between the ions in pseudo potential well and the remaining gas molecules. Such collisions are an effective way to dissipate kinetic energy of the ions, leading to reduction of their spatial and velocity distributions, and resulting in better mass resolving power and mass-to-charge measurement accuracy. FIG. 11C diagrams the point in time just prior to applying the forward accelerating field in pulsing region 231. Neutral gas pressure 229 has been reduced during the collection time period. As diagrammed in FIG. 11D, a forward electric field is applied in pulsing region 231 accelerating ions from the pseudo potential well near surface 220 through the grids of electrodes 227 and 228 into Time-Of-Flight drift region 230. The RF-field may or may not be turned off during the ion TOF pulse acceleration period. Subsequently, a neutral field is reapplied in pulsing region 231 and sample bearing gas is reintroduced into pulsing region 231 and ionized by Electron Ionization. The embodiment of the invention, as diagrammed in FIG. 11, improves Time-Of-Flight mass analysis resolving power and mass-to-charge measurement accuracy when operating with an EI source. Ions created with a large spatial and energy spread in pulsing region 231, are collected in the pseudo potential well near surface 220, constraining the spatial and energy spread prior to ion acceleration into Time-Of-Flight tube drift region 230. Collisional cooling of the trapped ions either from collisions of the ions with the surface or with residual gas molecules results in further reduction of the ions' spatial and energy spread, and improvement of the mass resolving power and mass-to-charge measurement accuracy.

A wide range of ion sources can be configured with the inventions described herein. Multiple ion sources can be configured in a TOF or hybrid TOF mass analyzer. For example, an EI source, orthogonal pulsing API source, and a MALDI source can be configured simultaneously in one TOF mass analyzer according to the invention. EI or Chemical ionization sources can be configured external the TOF pulsing region. The inventions can also be configured with a range of time-of-flight analyzer configurations that include ion reflectors, steering lenses and multiple detectors. A variety of vacuum system arrangements can be configured with the inventions as well. It is clear to one skilled in the art that variations in time-of-flight mass analyzers, control systems, RF-generating surface materials, RF electrode configurations for generating RF-fields above surfaces, pulsing region geometries, ion sources and hybrid mass analyzers can be configured that fall within the scope of the invention.

The invention can also be configured with other mass analyzer types such as Fourier Transform mass spectrometer (FTMS) and three dimensional quadrupole ion trap mass spectrometers. The invention can be configured to reduce the ion energy spread of an ion packet or to cause SID fragmentation of ions prior to transferring the ions into the FTMS cell or an ion trap. Higher ion trapping efficiency can be achieved in FTMS and ion trap mass analyzers when the energy and spatial spread of the primary ion beam is reduced by collection of ions and collisional cooling in a pseudo potential well near a surface. SID fragmentation allows higher fragmentation energy than can be achieved in gas phase CID in either the FTMS cell or ion trap mass analyzer. Combining a SID with FTMS and ion trap mass analyzers extends their range of analytical capability. In hybrid mass analyzer configurations of single or multiple steps of ion mass to charge selection, ion fragmentation or ion mobility separation can be conducted prior to directing the resulting ion population to the pseudo potential well near a surface in the pulsing region of a mass analyzer.

Having described this invention with regard to specific embodiments, it is to be understood that the description is not meant as a limitation since further modifications and variations may be apparent or may suggest themselves to those skilled in the art. It is intended that the present application cover all such modifications and variations as fall within the scope of the appended claims.

What is claimed:

1. An apparatus for trapping ions, comprising:
   (a) an array of electrodes;
   (b) applying AC voltages to electrodes of said array of electrodes;
   (c) at least one DC offset voltage applied to said electrodes of said array of electrodes;
   (d) a counter electrode;
   (e) at least one DC voltage applied to said counter electrode; and
   (f) means to control said AC and DC voltages to trap ions in a region between said array of electrodes and said counter electrode.

2. An apparatus according to claim 1 wherein said AC voltages have substantially opposite relative phases.

3. An apparatus according to claim 1 wherein the frequency of said AC voltages is radio frequency.

4. An apparatus according to claim 1 wherein said electrode array is formed by electrodes comprising metal wire tips.

5. An apparatus according to claim 1 wherein said electrode array is formed by electrodes comprising metal wires.

* * * * *